United States Patent [19]
Kitaori et al.

[11] Patent Number: 5,915,024
[45] Date of Patent: Jun. 22, 1999

[54] ELECTRONIC SIGNATURE ADDITION METHOD, ELECTRONIC SIGNATURE VERIFICATION METHOD, AND SYSTEM AND COMPUTER PROGRAM PRODUCT USING THESE METHODS

[75] Inventors: Shoji Kitaori; Yuichi Koganezawa, both of Yokohama, Japan

[73] Assignee: Kabushiki Kaisha Toshiba, Kawasaki, Japan

[21] Appl. No.: 08/877,555

[22] Filed: Jun. 17, 1997

[30] Foreign Application Priority Data

Jun. 18, 1996 [JP] Japan .................................. 8-156964

[51] Int. Cl.⁶ .................................................... H04K 1/00
[52] U.S. Cl. ................................ 380/25; 380/20; 380/21; 380/30; 380/4; 382/310; 395/186; 710/102; 710/104
[58] Field of Search ................................. 380/25, 24, 23, 380/3, 4, 30, 21, 33, 43–46, 49, 50, 52; 364/130, 136, 153, 184, 140.06, 140.09, 186, 222.5, 225.2, 200; 707/204, 101–104, 512, 515, 537, 540, 539; 395/182.04, 204, 600, 180, 370, 386–384, 390–392, 561, 733, 670, 182.01; 711/111, 162; 382/115–119, 124, 125, 175, 176, 181, 190, 209, 217, 232–235, 292, 243–244, 248, 251, 312, 305, 306; 235/380, 381, 382.5

[56] References Cited

U.S. PATENT DOCUMENTS

| | | | |
|---|---|---|---|
| 4,264,782 | 4/1981 | Konheim | 178/22 |
| 5,214,702 | 5/1993 | Fischer | 380/30 |
| 5,442,645 | 8/1995 | Ugon et al. | 371/25.1 |
| 5,504,818 | 4/1996 | Okano | 380/49 |
| 5,661,805 | 8/1997 | Miyauchi | 380/23 |
| 5,673,316 | 9/1997 | Auerbach et al. | 380/4 |
| 5,701,342 | 12/1997 | Anderson et al. | 380/4 |
| 5,717,759 | 2/1998 | Micali | 380/25 |
| 5,719,940 | 2/1998 | Ahn et al. | 380/25 |
| 5,748,738 | 5/1998 | Bisbee et al. | 380/25 |
| 5,748,782 | 5/1998 | Ferreira | 382/232 |
| 5,761,311 | 6/1998 | Spelman et al. | 380/30 |
| 5,794,254 | 8/1998 | McClain | 707/204 |
| 5,825,880 | 10/1998 | Sudia et al. | 380/21 |
| 5,835,594 | 11/1998 | Albrecht et al. | 380/23 |

OTHER PUBLICATIONS

Applied Cryptography, (1996), chapter 19, pp. 466–475, Bruce Schneier "Public–key Algorithms".

Network Security,(1995) pp. 329–353, Charlie Kaufman "Electronic Mail Security".

*Primary Examiner*—Tod R. Swann
*Assistant Examiner*—Paul E. Callahan
*Attorney, Agent, or Firm*—Oblon, Spivak, McClelland, Maier & Neustadt, P.C.

[57] ABSTRACT

An apparatus for adding an electronic signature to document data includes a delimiter character detector for dividing the input document data into a plurality of divided document data by using as a delimiter a predetermined character appearing in a document represented by the document data, a digest generator and an encrypter for generating an electronic signature based on the divided document data for each divided document data, and a signature-added message generator for generating the divided document data, the electronic signature based on the divided document data, and information for associating the divided document data with the electronic signature.

30 Claims, 18 Drawing Sheets

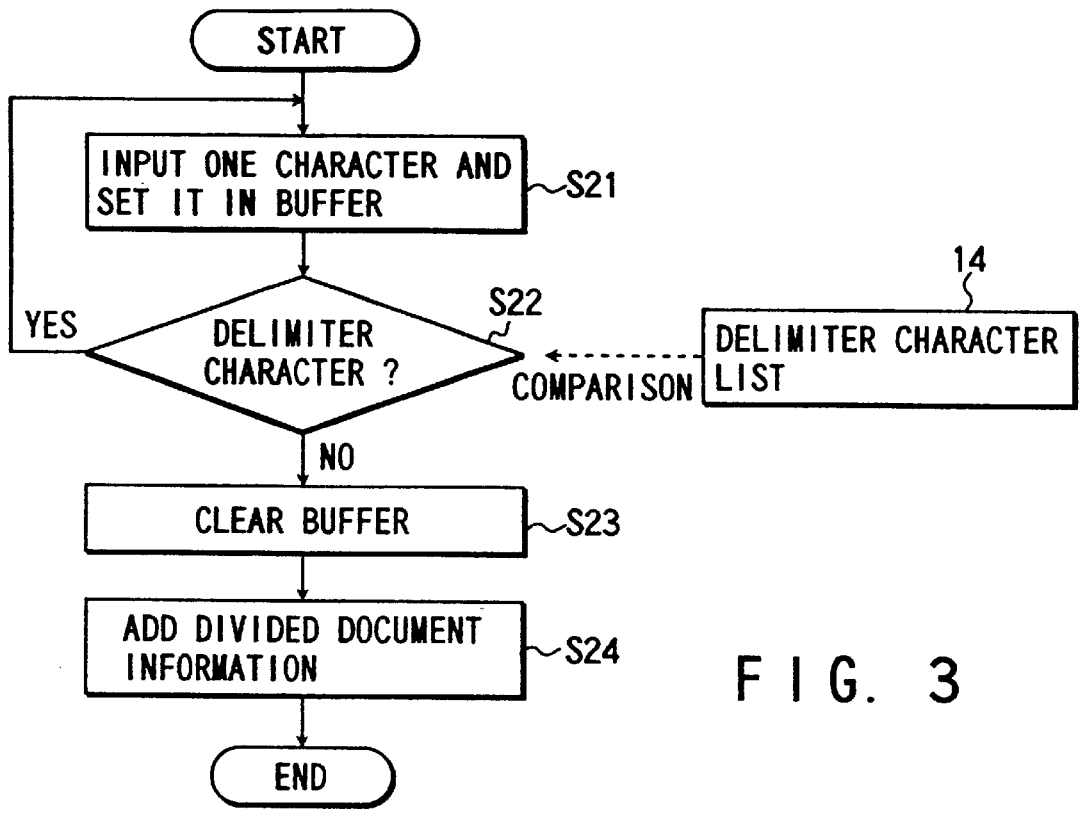
F I G. 3
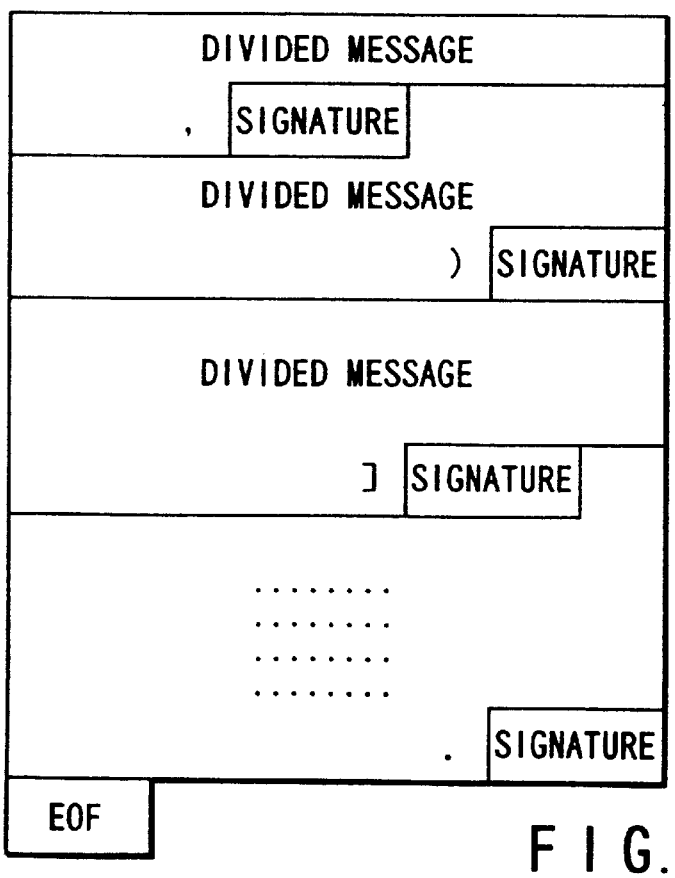
F I G. 4

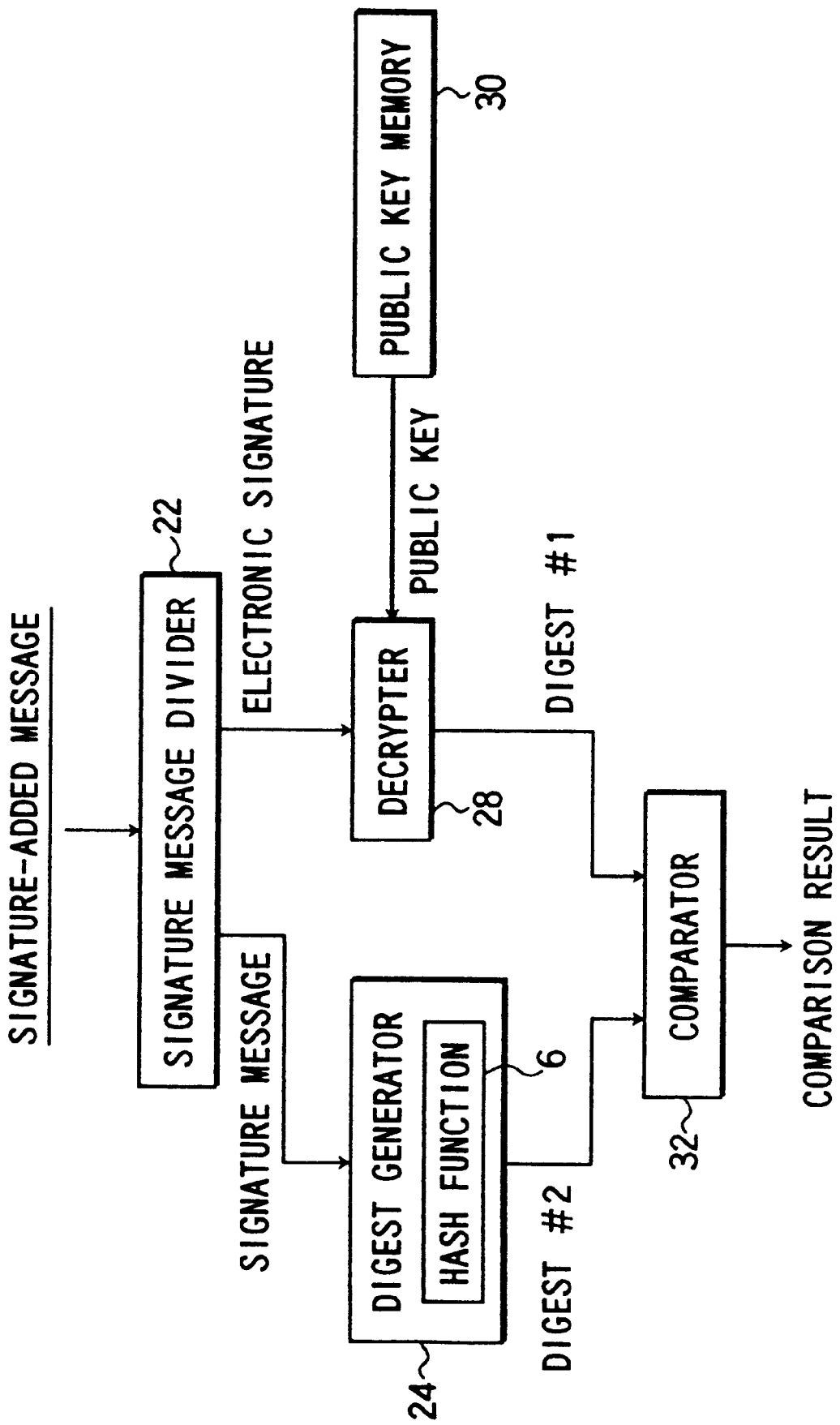
F I G. 5

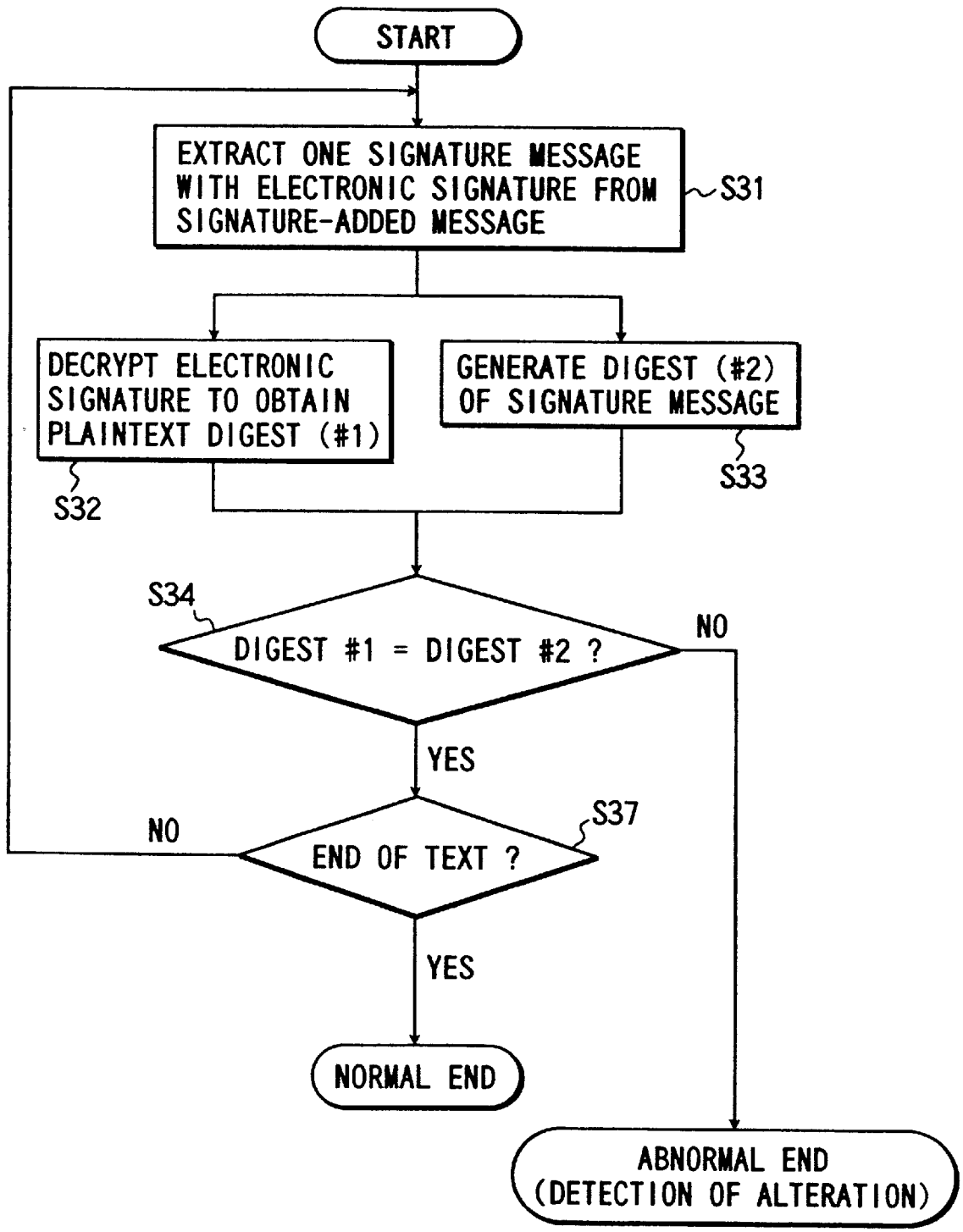
F I G. 7

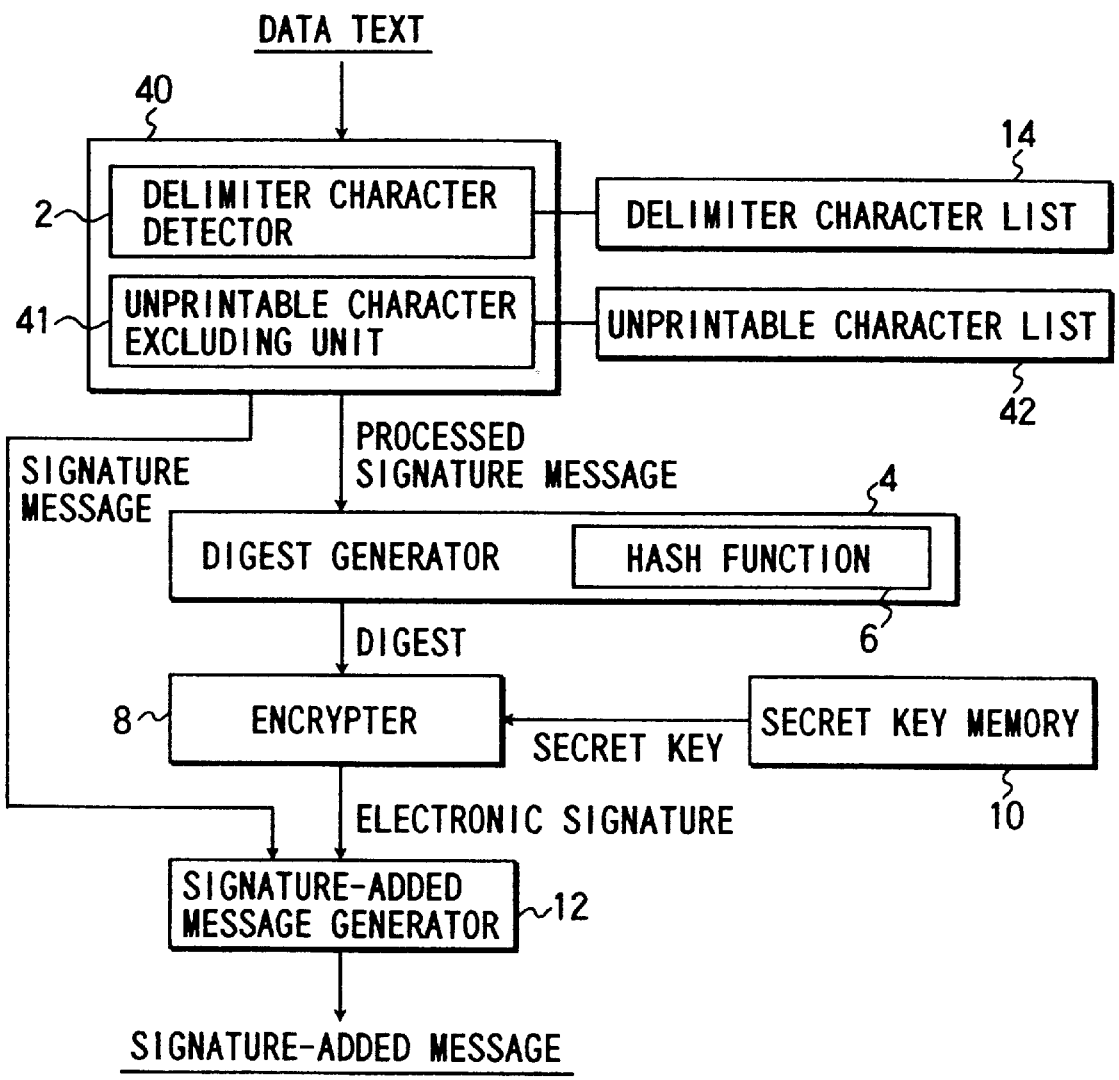
F I G. 8

| 000 nul | 001 soh | 002 stx | 003 etx | 004 eot | 005 enq | 006 ack | 007 bel |
|---|---|---|---|---|---|---|---|
| 010 bs | 011 ht | 012 nl | 013 vt | 014 np | 015 cr | 016 so | 017 si |
| 020 dle | 021 dc1 | 022 dc2 | 023 dc3 | 024 dc4 | 025 nak | 026 syn | 027 etb |
| 030 can | 031 em | 032 sub | 033 esc | 034 fs | 035 gs | 036 rs | 037 us |
| 040 sp | 041 ! | 042 " | 043 # | 044 $ | 045 % | 046 & | 047 ' |
| 050 ( | 051 ) | 052 * | 053 + | 054 , | 055 - | 056 _ | 057 / |
| 060 0 | 061 1 | 062 2 | 063 3 | 064 4 | 065 5 | 066 6 | 067 7 |
| 070 8 | 071 9 | 072 : | 073 ; | 074 < | 075 = | 076 > | 077 ? |
| 100 @ | 101 A | 102 B | 103 C | 104 D | 105 E | 106 F | 107 G |
| 110 H | 111 I | 112 J | 113 K | 114 L | 115 M | 116 N | 117 O |
| 120 P | 121 Q | 122 R | 123 S | 124 T | 125 U | 126 V | 127 W |
| 130 X | 131 Y | 132 Z | 133 [ | 134 \ | 135 ] | 136 ^ | 137 _ |
| 140 ` | 141 a | 142 b | 143 c | 144 d | 145 e | 146 f | 147 g |
| 150 h | 151 i | 152 j | 153 k | 154 l | 155 m | 156 n | 157 o |
| 160 p | 161 q | 162 r | 163 s | 164 t | 165 u | 166 v | 167 w |
| 170 x | 171 y | 172 z | 173 { | 174 | | 175 } | 176 ~ | 177 del |

F I G. 11

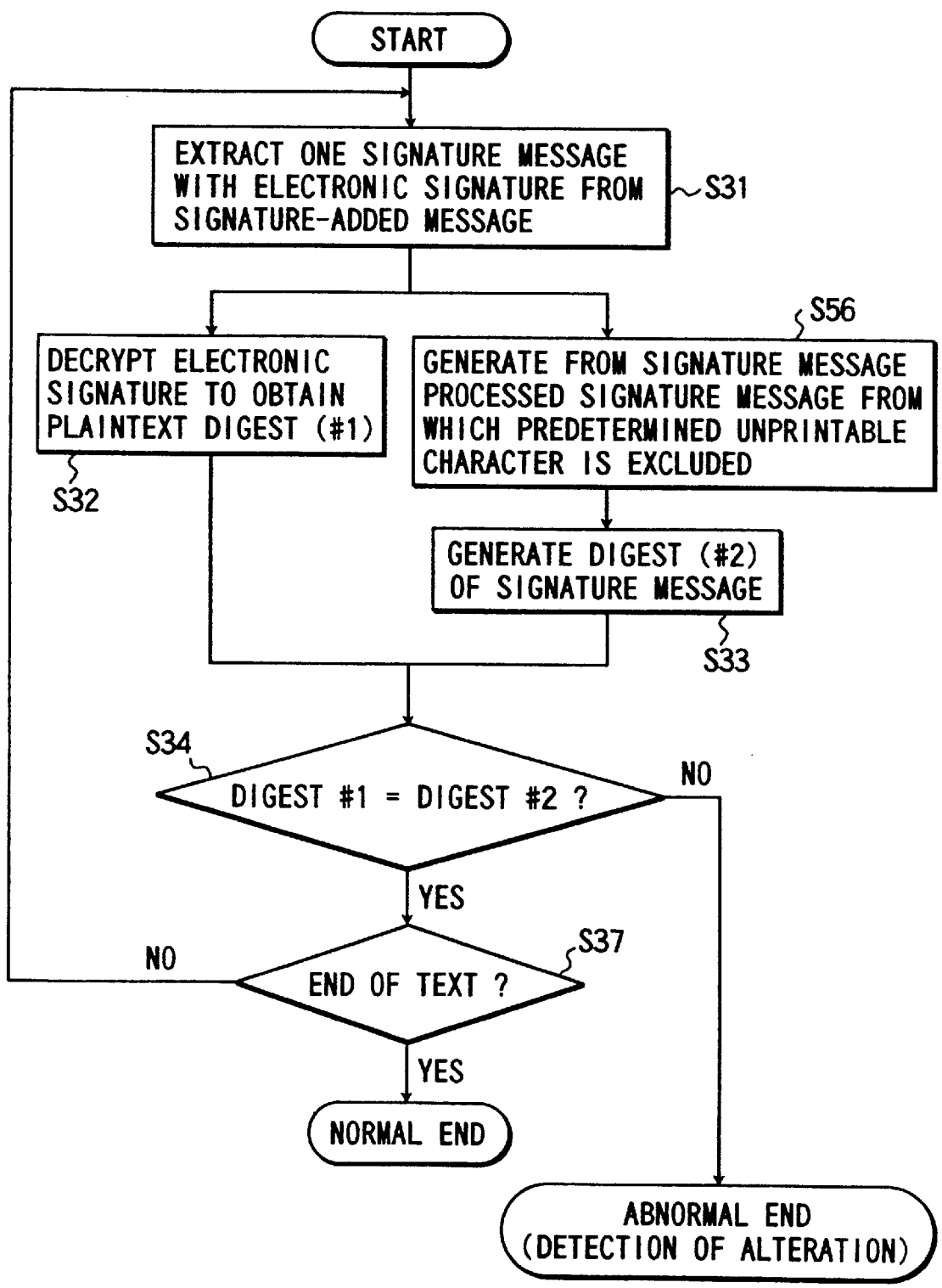
F I G. 14

MAXIMUM NUMBER OF INVALID CHARACTERS FOR
RELIABILITY LEVEL = 0.000100

| NUMBER OF VALID CHARACTERS | BIT LENGTH OF DIGEST | | | |
|---|---|---|---|---|
| | 32 | 64 | 128 | 256 |
| $2^1$ | 2 | 6 | 14 | 27 |
| $2^2$ | 2 | 6 | 13 | 26 |
| $2^3$ | 2 | 5 | 12 | 25 |
| $2^4$ | 2 | 5 | 11 | 24 |
| $2^5$ | 1 | 4 | 11 | 23 |
| $2^6$ | 1 | 4 | 10 | 21 |
| $2^7$ | 1 | 4 | 9 | 19 |
| $2^8$ | 1 | 3 | 8 | 18 |
| $2^9$ | 1 | 3 | 8 | 17 |
| $2^{10}$ | 1 | 3 | 7 | 16 |
| $2^{11}$ | 1 | 3 | 7 | 15 |
| $2^{12}$ | 1 | 2 | 6 | 14 |
| $2^{13}$ | 1 | 2 | 6 | 13 |
| $2^{14}$ | 0 | 2 | 6 | 12 |
| $2^{15}$ | 0 | 2 | 5 | 12 |
| $2^{16}$ | 0 | 2 | 5 | 11 |
| $2^{17}$ | 0 | 2 | 5 | 10 |
| $2^{18}$ | 0 | 2 | 4 | 10 |
| $2^{19}$ | 0 | 2 | 4 | 10 |

FIG. 15

```
#define ILL_CHARS (34)
double lTrustMD(m,k,l)
int m;  /* NUMBER OF VALID CHARACTERS FOR DIGEST   */
int k;  /* NUMBER OF INVALID CHARACTERS FOR DIGEST */
int l;  /* BIT LENGTH OF DIGEST                    */
{
        int i;

double mdlimit = pow(2.0,(double)l);
        double var     = 1;

for ( i=1; i<k+1; i++)
                var = var*ILL_CHARS*(m+i);

return var/mdlimit;
}
```

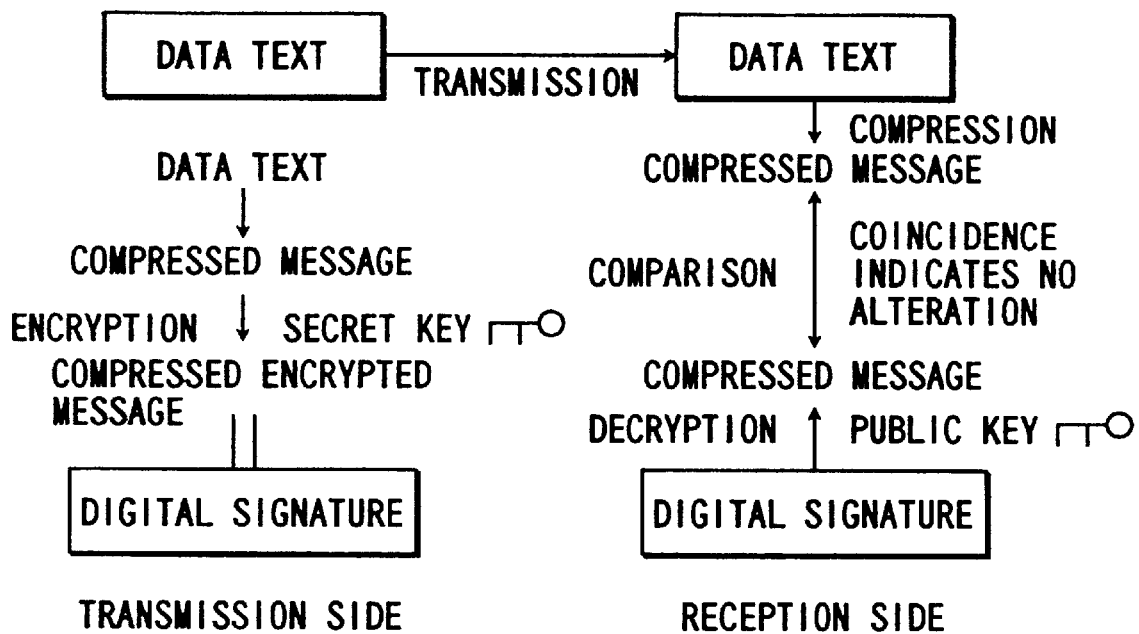
F I G. 19
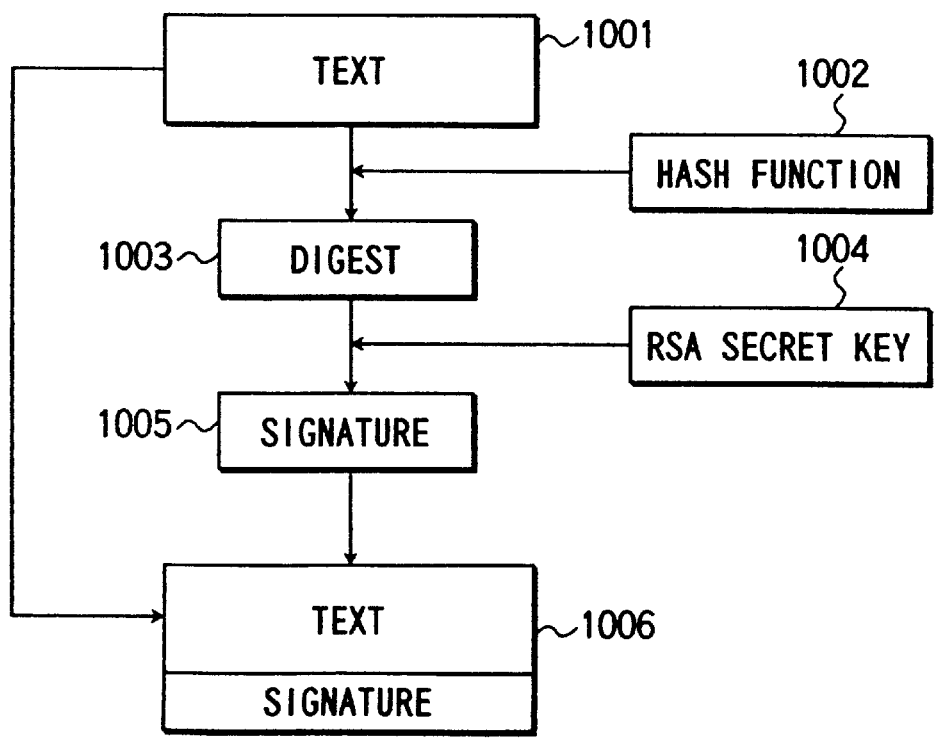
F I G. 20

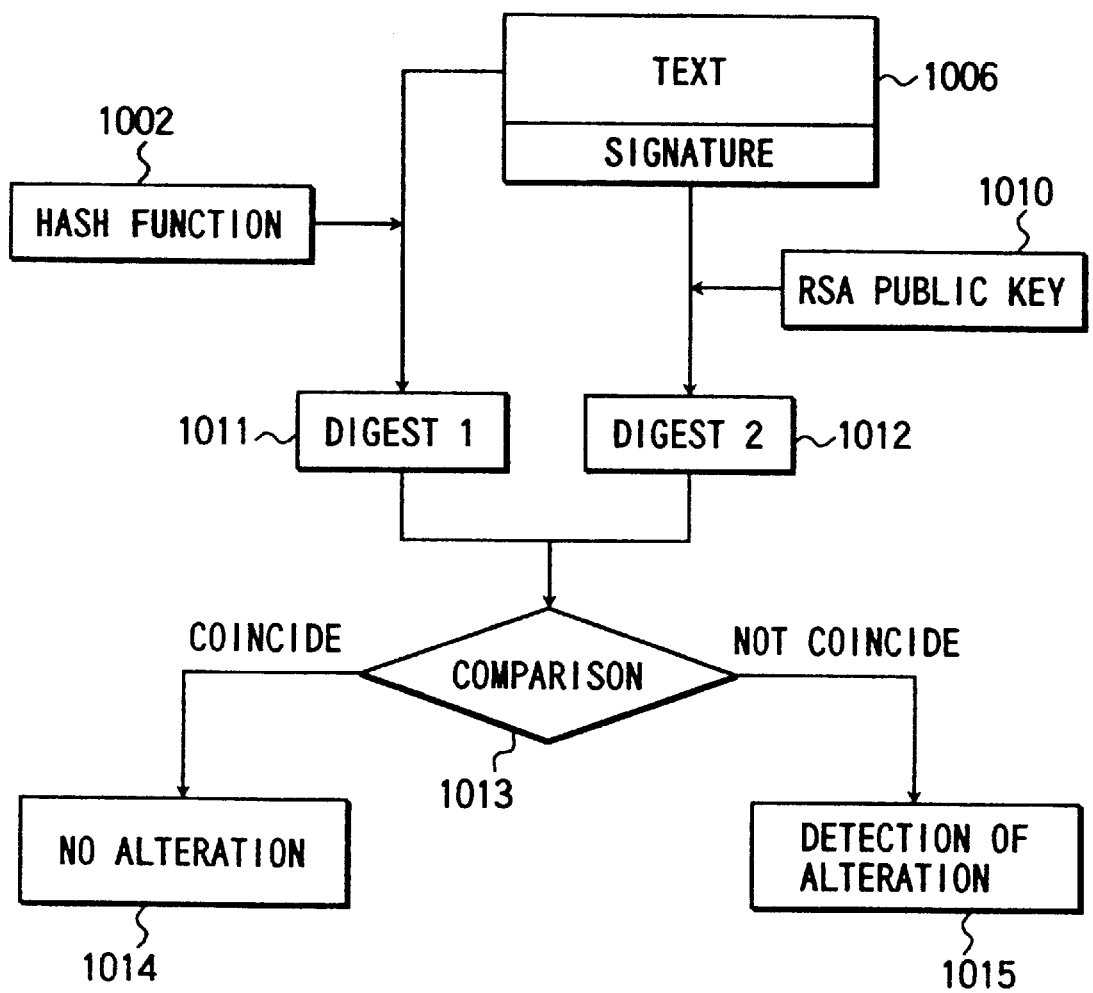
F I G. 21

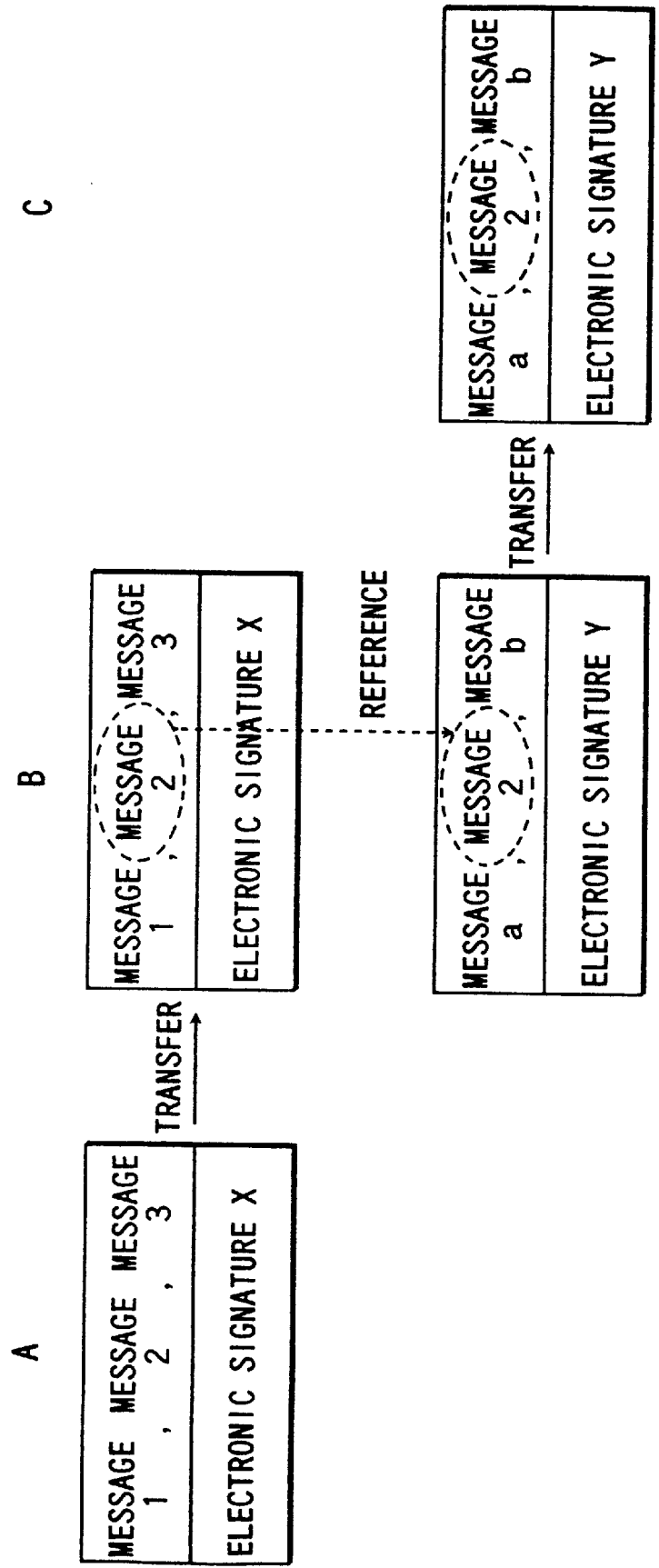

ELECTRONIC SIGNATURE ADDITION METHOD, ELECTRONIC SIGNATURE VERIFICATION METHOD, AND SYSTEM AND COMPUTER PROGRAM PRODUCT USING THESE METHODS

BACKGROUND OF THE INVENTION

The present invention relates to a method of adding and verifying an electronic signature added to document data in order to authenticate the validity of the document data and a system using this method and, more particularly, to a method of effectively preventing alteration of document data, and a system using this method.

In recent years, systems for electronically converting (encoding) document information represented by E-mails and transmitting/receiving the encoded document information are very popular. The received electronic document information is normally accumulated in a magnetic recording medium or the like and can be partially cited.

Documents are generally classified into those having contents that can be accessed by only authorized parties and those having contents that can be accessed by indefinite parties. For example, the former documents correspond to electronic document information having contents associated with confidentiality of individual business enterprises and personal privacy. The latter documents correspond to electronic document information having contents that a business enterprise, a person, or a public organization intends to inform the third party of events and information. The electronic document information of the former document can be encrypted and kept secret from a person who does not have a decryption key. The electronic document information of the latter document is a free access plaintext.

The contents of the electronic document information of the latter document may be illicitly altered because this information is normally a plaintext. In particular, public information (electronic information) is often the target for a grapevine or information alteration. If such an illicit act happens, the social influence becomes serious.

To verify that the contents of an electronic document are not altered, electronic signature data is added to the electronic document, as needed. This electronic signature data verifies that "an electronic document with the electronic signature is indeed drafted by a public organization and is not illicitly altered information or a grapevine".

The principle of an electronic signature will be described by taking an E-mail as an example.

FIG. 19 shows a conventional processing flow of an E-mail to which an electronic signature is applied.

(1) When sending a data text to a receiver, the transmitting side compresses the data text to generate a digest (compressed text), encrypts the digest with the secret key of the transmitting side to generate data (compressed encrypted text) called a digital signature, adds the digital signature to the data text, and transmits the resultant data.

(2) The receiving side uses a public key corresponding to the secret key of the transmitting side to decrypt the digital signature data added to the data text, thereby obtaining the original digest data. At the same time, the receiving side compresses the received data text to generate digest data. The receiving side then compares these two digest data and can determine whether the data text is correct.

As described above, the electronic signature has (1) a message verification function of guaranteeing that information is not altered and is correct as original information, and (2) an entity verification function of guaranteeing that an entity A (e.g., person A) engaged in actions such as generation, transmission, processing, storage, and determination of information is actually the entity A.

More specifically, assume that some problem is posed between the entity A and an entity B on information written by the entity A. In this case, the electronic signature has (1) a function of allowing the B side to verify that indeed the sender of the message at issue is A, and the entity B can exhibit an evidence which explicitly indicates this fact, and (2) a function of inhibiting B from drafting a "counterfeit" message and asserting that the "sender of this message is A".

The signature data generation sequence on the transmitting side will be described in detail with reference to FIG. 20.

A whole text 1001 is converted into a compressed text 1003, i.e., the digest 1003 by conversion processing using a hash function 1002.

The hash function is a one-way function for converting digital data having an arbitrary length into digital data having a fixed length. According to the characteristic features of the hash function, it is very difficult to estimate the original data from the converted data, and the converted data is an unpredictable random number. By these features, long digital data need not be entirely signed by encryption. When the fixed-length digital data, i.e., the message digest generated by the hash function is encrypted, an effect equivalent to signature of the entire data can be expected. A known hash function is MD5 (reference: RFC1321 The MD5 Message-Digest Algorithm).

The digest 1003 is encrypted using information known to only a user himself as a key 1004. A key used here is a secret key of asymmetric key encryption scheme. In particular, RSA is most popular.

A signature 1005 generated as described above is transmitted together with the text (1006 in FIG. 19) and verified on the receiving side.

The RSA scheme will be briefly described.

The RSA is a system devised by R. L. Rivest, A. Shamir, and L. Adleman. This technique depends on modulo exponents. A parameter pair consisting of a public exponent and an arithmetic modulo are defined as a public key, whereas a parameter pair consisting of a secret exponent and an arithmetic modulo are defined as a secret key. This asymmetric algorithm uses the following symbols and abbreviations:

X, Y: data block smaller than arithmetic modulo
n: arithmetic modulo
e: public exponent
d: secret exponent
p, q: prime number; product of prime numbers p and q is arithmetic modulo (n)
lcm: least common multiple
mod n: arithmetic modulo n and uses the exponential functions for transferring a data block:
Y=X^e mod n (where, 0≦X<n)
X=Y^d mod n (where, 0≦Y<n)

For example, these functions are satisfied by the following solutions:
ed mod lcm (p−1, q−1)=1 or
ed mod (p−1) (q−1)=1

In order to validate this processing, the data block must be interpreted as an integer.

In this case, (e, n) is disclosed to the public, and d is the secret key. The digest is encrypted using the secret key d in the signature. Anyone can generate a digest, but it is very difficult to derive the secret key d from the disclosed (e, n). For this reason, in fact, only the user himself who knows the secret key d can affix the signature. However, since (e, n) is disclosed to the public and these parameters satisfy the above predetermined calculation expressions, anyone can decrypt the encrypted signature and verify the signature.

The signature verification sequence on the receiving side will be described in detail with reference to FIG. 21.

The receiving side generates digest 1 (1011 in FIG. 21) from a predetermined hash function 1002 from the text of a received message 1006 with a signature. By using an RSA public key 1010, the receiving side decrypts the signature added to the text to generate digest 2 (1012 in FIG. 21) as a compressed text generated by the writer of the text. Digests 1 and 2 are compared with each other (1013). If digest 1 coincides with digest 2, the text is a message drafted by the person who appended the signature (1014); otherwise, it is possible to detect a wrong signature or alteration of the message (1015).

The electronic signature can prevent alteration of documents, and reliability of the contents of documents can be maintained.

Various problems are posed by the conventional electronic signature method described above.

The first problem is experienced when part of an E-mail text is cited and the cited portion is transmitted.

More specifically, according to the conventional electronic signature method, an electronic signature is added to a whole text. When a given block of the text is cited, the electronic signature is of no use for the cited block. That is, one often wants to cite a paragraph as a block of an E-mail text, which has a meaning by itself and is verifiable not to have been altered. Even in this case, an electronic signature of the writer cannot be added to the given paragraph according to the conventional method. For example, when only the given paragraph is cited and transferred to a third party, the third party cannot verify the source of the given paragraph.

More specifically, as shown in FIG. 22, assume that an electronic signature X is added to a message consisting of messages 1, 2, and 3 written by the entity A, and the resultant data is transferred to the entity B. Thereafter, the entity B cites only message 2 from the message written by the entity A and writes a message consisting of messages a, 2, and b, adds an electronic signature Y to them, and sends the resultant data to an entity C (it is assumed that the message a describes that the writer of message 2 is A). In this case, the entity C cannot verify whether the writer of message 2 is A as the entity B maintains.

In order to avoid the above inconvenience, in the above detailed example, to allow the entity B to transfer only message 2 to the entity C, the entire message consisting of messages 1, 2, and 3, and its electronic signature must be transferred, resulting in inconvenience.

The second problem is posed when an E-mail text is edited and transferred.

More specifically, assume that the whole message is cited. In this case, when editing involving no character printing is performed, i.e., when a line return or a blank (space) is entered amidst the document, the conventional electronic signature mechanism detects that the document has been altered, although the meaning of the document has not been changed. Under these circumstances, it is very useful detecting that the document is not altered when the meaning of the document has not been changed.

The third problem is posed when a document is intentionally altered.

A person who intends to alter a document devises the altering method so that the message digest of the altered document matches the message digest before alteration. For this purpose, for example, an unprintable character can be used.

More specifically, if several unprintable characters are inserted in this document in altering a document, it may be possible to generate the same message digest as in the document before alteration, although the meaning of the document is altered.

For example, the "fee is 10,000 yen." is altered to the "fee is 100,000 yen." When this altered document is converted by a hash function to generate a digest, the digest does not coincide with that of the digest of the document before alteration, thereby detecting alteration. To the contrary, when an unprintable character such as a space (_) is inserted in the altered document to obtain the "fee is_100,000 yen." or the "fee is_100,000 yen._", a digest which may coincide with the original digest can be found. In this case, the system determines that no alteration is made. Since the space is not printed, alteration cannot be found upon visual observation.

Conventionally, on the receiving side of a document added with an electronic signature, no clue has been given as to the possibility of the above alteration or reliability of the document.

BRIEF SUMMARY OF THE INVENTION

It is, therefore, the first object of the present invention to provide an electronic signature addition method and an electronic signature apparatus, capable of verifying a given cited message of an electronic document with an electronic signature even if the given message is cited from the electronic document.

It is the second object of the present invention to provide an electronic signature addition method and an electronic signature apparatus, capable of processing a document as a non-altered document when a control character such as a space or a line return which is not associated with the meaning of a document with an electronic signature is inserted, i.e., when the meaning itself of the document is not altered.

It is the third object of the present invention to provide an electronic signature verification method capable of estimating an alteration possibility and informing a receiver of an alarm by providing an algorithm for preventing reliability of the electronic signature from degrading due to insertion of an unprintable character in a text.

In order to achieve the above objects according to the first aspect of the present invention, there is provided a method of adding an electronic signature to document data, comprising the steps of:

dividing the document data into a plurality of divided document data using as a delimiter a predetermined character appearing in a document represented by the document data;

generating an electronic signature for each of the divided document data on the basis of the divided document data; and storing the divided document data, the electronic signature based on the divided document data, and information for associating the divided document data with the electronic signature.

With this arrangement, since the validity of the document can be determined in units of divided document data, even if each divided document data is cited together with an electronic signature the validity of the cited portion can be determined.

According to the second aspect, there is provided a method of adding an electronic signature to document data, comprising the steps of:

storing the document data upon excluding a predetermined character appearing in a document represented by the document data;

generating an electronic signature on the basis of the document data from which the predetermined character is excluded; and storing the document data from which the predetermined character is not excluded, the electronic signature, and information for associating the electronic signature with the document data from which the predetermined character is not excluded.

With the above arrangement, when a control character such as a space or a line return which is not associated with the meaning of a document with an electronic signature is inserted in the document by setting a specific character, i.e., when the meaning itself of the document is not changed, the document is determined not to have been altered.

In addition, with the above arrangement, use of an unprintable character in altered document data to obtain validity using an electronic signature can be prevented.

According to the third aspect, there is provided a method of evaluating reliability associated with alteration of document data with an electronic signature, comprising the steps of:

obtaining a total number of printable characters in the document data and a total number of unprintable characters in the document data; and evaluating reliability on the basis of the total numbers of printable and unprintable characters.

With the above arrangement, the reliability of the electronic signature can be calculated to allow evaluation of the alteration possibility on the basis of the total numbers of printable and unprintable characters.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a flow chart showing a signature message generation processing sequence in a delimiter character detector;

FIG. 4 is a view showing an example of a message with electronic signatures;

FIG. 5 is a block diagram showing the arrangement of an electronic signature verification apparatus according to the first embodiment;

FIG. 7 is a flow chart showing another signature verification processing sequence according to the first embodiment;

FIG. 8 is a block diagram showing the arrangement of an electronic signature adding apparatus according to the second embodiment of the present invention;

FIG. 11 is a table showing unprintable characters in ASCII codes;

FIG. 14 is a flow chart showing another signature verification processing sequence according to the second embodiment;

FIG. 15 is a table showing the calculation result of the maximum number of unprintable characters assumed to allow alteration with a probability of 1/10,000 or less by using the number of characters of a document (number of valid characters) and the bit length of a digest as parameters;

FIG. 19 is a diagram for explaining a conventional electronic signature mechanism;

FIG. 20 is a flow chart for explaining a conventional electronic signature addition method;

FIG. 21 is a flow chart for explaining a conventional electronic signature verification method; and FIG. 22 is a view for explaining partial document citation in the conventional electronic signature.

DETAILED DESCRIPTION OF THE INVENTION

The preferred embodiments of the present invention will be described with reference to the accompanying drawing.

An embodiment of the present invention comprises an electronic signature addition system for adding an electronic signature to communication data such as an E-mail and an electronic signature verification system for verifying the electronic signature contained in the received communication data. These systems are normally installed in a terminal device for transmitting electronic data, a reception terminal device for receiving the electronic data, and a communication medium for connecting the transmission and reception terminal devices.

The communication medium is typically a computer network, but may be a portable information recording medium such as a floppy disk or a CD-ROM. Alternatively, the medium itself may function as an electronic signature addition system or electronic signature verification system, i.e., a computer device such as an IC card including a radio communication unit, a processing unit, and a storage unit.

First Embodiment

The first embodiment of the present invention will be sequentially described with reference to an electronic signature addition system and an electronic signature verification system in the order named.

The electronic signature addition system will be described first.

Figure 1:
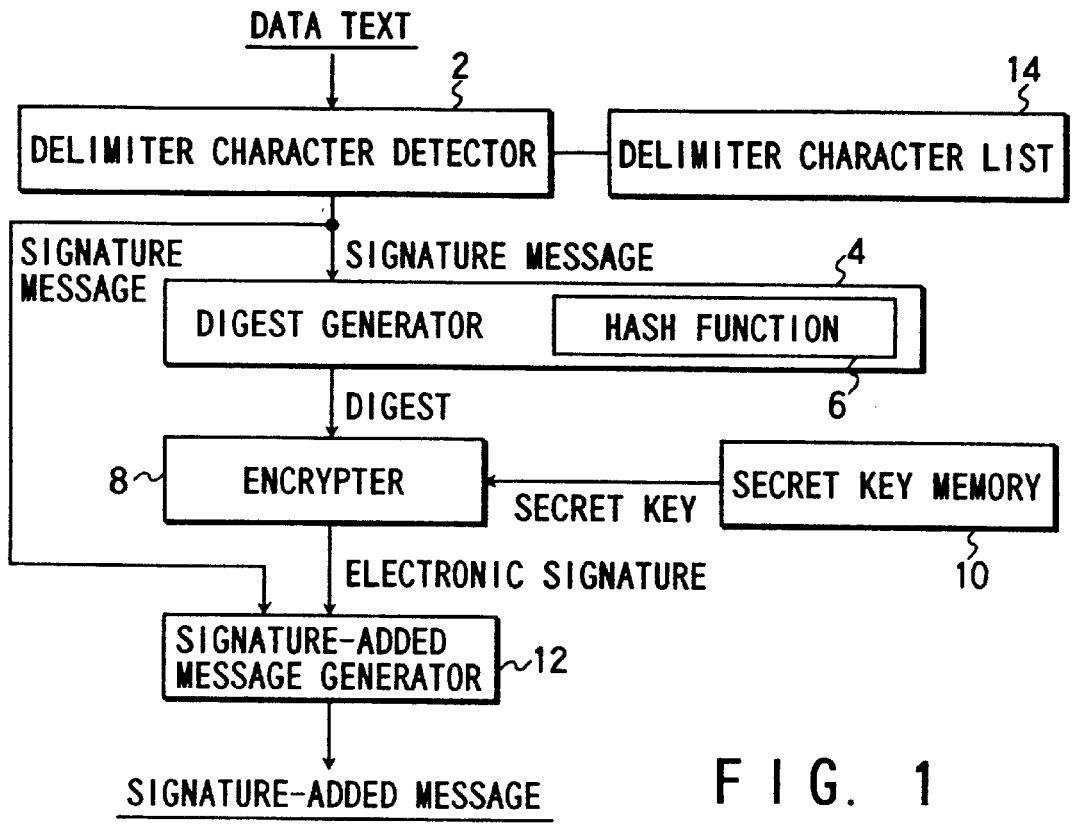
FIG. 1 is a block diagram showing the arrangement of an electronic signature adding apparatus according to the first embodiment of the present invention.

FIG. 1 is a block diagram showing the arrangement of this system. Although not shown, this system is implemented by necessary peripheral devices such as a memory in addition to a CPU.

The system is installed in, e.g., a transmitting terminal device, and comprises a delimiter character detector 2, a digest generator 4, an encrypter 8, a secret key memory 10, and a signature-added message generator 12.

A data text in FIG. 1 is, e.g., the whole text of an E-mail, i.e., a whole text added with a signature. The data text is typically a document constituted by a plurality of message or paragraphs.

Figure 2:
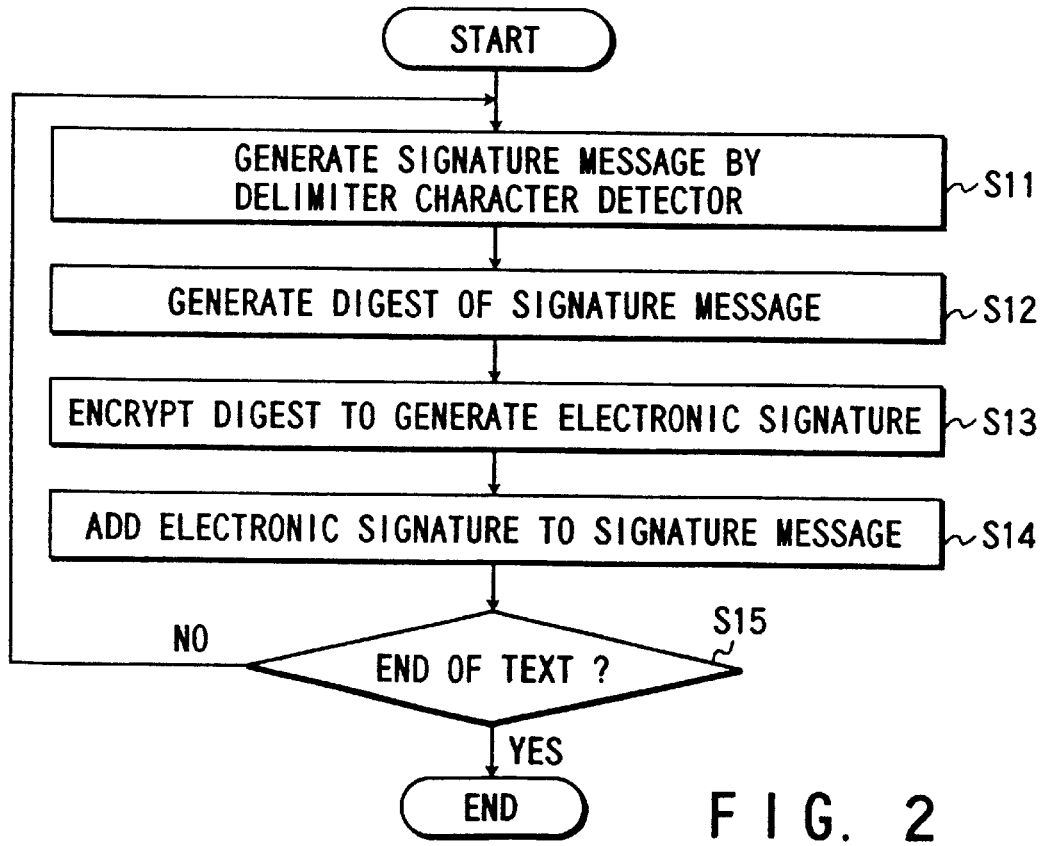
FIG. 2 is a flow chart showing a signature adding processing sequence of the first embodiment.

The delimiter character detector 2 has a function of detecting a predetermined delimiter character from the data text and dividing the data text into signature message each having a delimiter character at the end of the message and an appropriate length (see step S11 in FIG. 2).

The delimiter character to be detected can be defined as an arbitrary position symbol or a plurality of characters. For example, a period "." can be used. Alternatively, an end-of-message character "ASCII: nl=0A (hex)" and an end-of-paragraph character "ASCII: cr=0D (hex)" may be used. In addition to the period ".", a plurality of delimiter characters such as a comma ",", a closing bracket "]", a closing brace "}", a closing parenthesis ")", the end-of-message character "ASCII: nl=0A (hex)", and the end-of-paragraph character "ASCII cr=0D (hex)" can be used as detection targets, as needed. Various other delimiter characters can be defined.

As shown in FIG. 1, the delimiter character detector 2 has a limiter character list 14. The defined delimiter characters are stored in this delimiter character list 14 in advance.

FIG. 3 shows a processing sequence of this delimiter character detector 2. The detector 2 extracts the first character from the data text and stores it in a buffer (not shown) (step S21). It is then determined whether the character stored in the buffer is a predetermined delimiter character registered in the delimiter character list 14 (step S22). If NO in step S22, the next character is extracted from the data text and stored in the buffer, and the above operations are repeated. Several characters from the start of a document are rarely delimiter characters (comma "," or period "."). Therefore, the above processing is repeated for a plurality of characters.

When it is determined in step S22 that the character stored in the buffer is a delimiter character (e.g., extraction reaches a comma "," or period "."), a character string including this delimiter character in the buffer is obtained as one "signature message". The signature message is output from the buffer (step S23), and then the buffer is cleared.

In this case, the delimiter character detector 2 adds divided document information to the signature message (step S24). This divided message information represents a sequence number representing the serial number of the signature message from the beginning, signer information (signer ID), a document name (document ID), and the like.

The divided document information is interposed between, e.g., ##SN=" and "##" and inserted before or after the signature message.

As shown in FIG. 1, the digest generator 4 applies a hash function 6 to this signature message (containing the divided document information) to generate a message digest (step S12 in FIG. 2). The hash function 6 and the bit length of the digest used in this conversion are predetermined. In this embodiment, "MD5" is used as the hash function 6, and the bit length of the digest is 128 bits. When SHA is used as the hash function, the bit length of the digest becomes 160 bits. Any other algorithm may be used as a hash algorithm. Note that a hash function used in conversion may be set selectable, and information representing a hash function (or the hash function and the bit length of the digest) used in practice may be added to a signature-added message.

The encrypter 8 encrypts the digest using the self secret key stored in the secret key memory 10 (step S13 in FIG. 2). The digest thus encrypted is used as an electronic signature. The RSA scheme is used as an encryption scheme.

The above secret key must be kept secret against others. For example, an IC card may be used as the secret key memory 10, the above secret key may be recorded on the IC card, the IC card may be set in an IC card reader (not shown) if necessary, and the secret key read by the IC card reader may be transferred to the encrypter 8. Alternatively, a plurality of secret keys may be prepared depending on destinations.

The signature-added message generator 12 adds the electronic signature thus obtained to the signature message (step S14). In this embodiment, the electronic signature is inserted after the signature message to generate a signature-added message. An electronic signature may be inserted before each signature message, or all the electronic signatures may be inserted altogether before the entire document.

The above processing is repeatedly executed until the data test reaches the last character or sentence (step S15). More specifically, it is determined in step S15 whether the current signature message is the last sentence of the data text. If NO in step S15, the flow returns to processing of the delimiter character detector 2 in the delimiter detection step S11. Processing in step S11 to S14 is repeated until the end of the data text.

As a result of this processing, for example, a message with signatures, shown in FIG. 4 is obtained. The electronic signatures are inserted after the signature message (divided messages), so that the signatures are inserted at proper intervals in the data text.

Information indicating electronic signature data is preferably contained in the electronic signature. For example, data obtained by interposing an electronic signature body (i.e., data obtained by encrypting a digest) between "##Signature=" and "##" can be used.

Each electronic signature must contain information associated with an original document, information associated with division, signer information, and a signature method so as not to lose validity even if each signature message (divided message) is used in other E-mails. The format of this electronic signature is constituted in, e.g., the following table.

TABLE 1

Format of Electronic Signature

| | | |
|---|---|---|
| First field | 1 byte | Version number |
| Second field | 1 byte | Length up to seventh field |
| Third field | 1 byte | Signature type |
| Fourth field | 4 bytes | Date of signature |
| Fifth field | 0/2 bytes | Valid signature period |
| Sixth field | 32 bytes | Divided document information Signer ID Document name Document serial number |
| Seventh field | 8 bytes | Key ID |
| Eighth field | 1 byte | Public key encryption scheme |
| Ninth field | 1 byte | Hash function scheme |
| 10th field | 2 bytes | First two types of message digest |
| 11th field | variable length | Electronic signature body (encrypted message digest) |

The format of the electronic signature comprises the first to 10th fields serving as an electronic signature header, and the 11th field for storing the electronic signature body. The first field is used for the version number of the signature format. The second field represents the length up to the seventh field. The third field represents the type of signature. The fourth field is used for the date of signature. The fifth field stores the valid date of signature, but the valid date may not be set.

The sixth field records a divided document message. This divided message has signer information (signer name and ID), a document name, a divided document serial number, and the like. The information stored in the sixth field includes all or part of the divided document information inserted in the signature message in step S24 of FIG. 3.

A key ID is stored in the seventh field. By using this key ID and the signer, a public key to be used by a receiver can be specified. A public key encrypting scheme used can be specified by the eighth field.

Information for specifying a hush function (e.g., MD5) used to generate a message digest is stored in the ninth field. The first 2-byte information of the message digest is stored in the 10th field and is used to check the signature.

The 11th field stores the electronic signature body, i.e., data obtained such that data obtained by adding information (divided document information) contained in the sixth field to the signature message is multiplied with the hash function, and the product is encrypted using the secret key.

The electronic signature verification system of this embodiment will be described.

Figure 6:
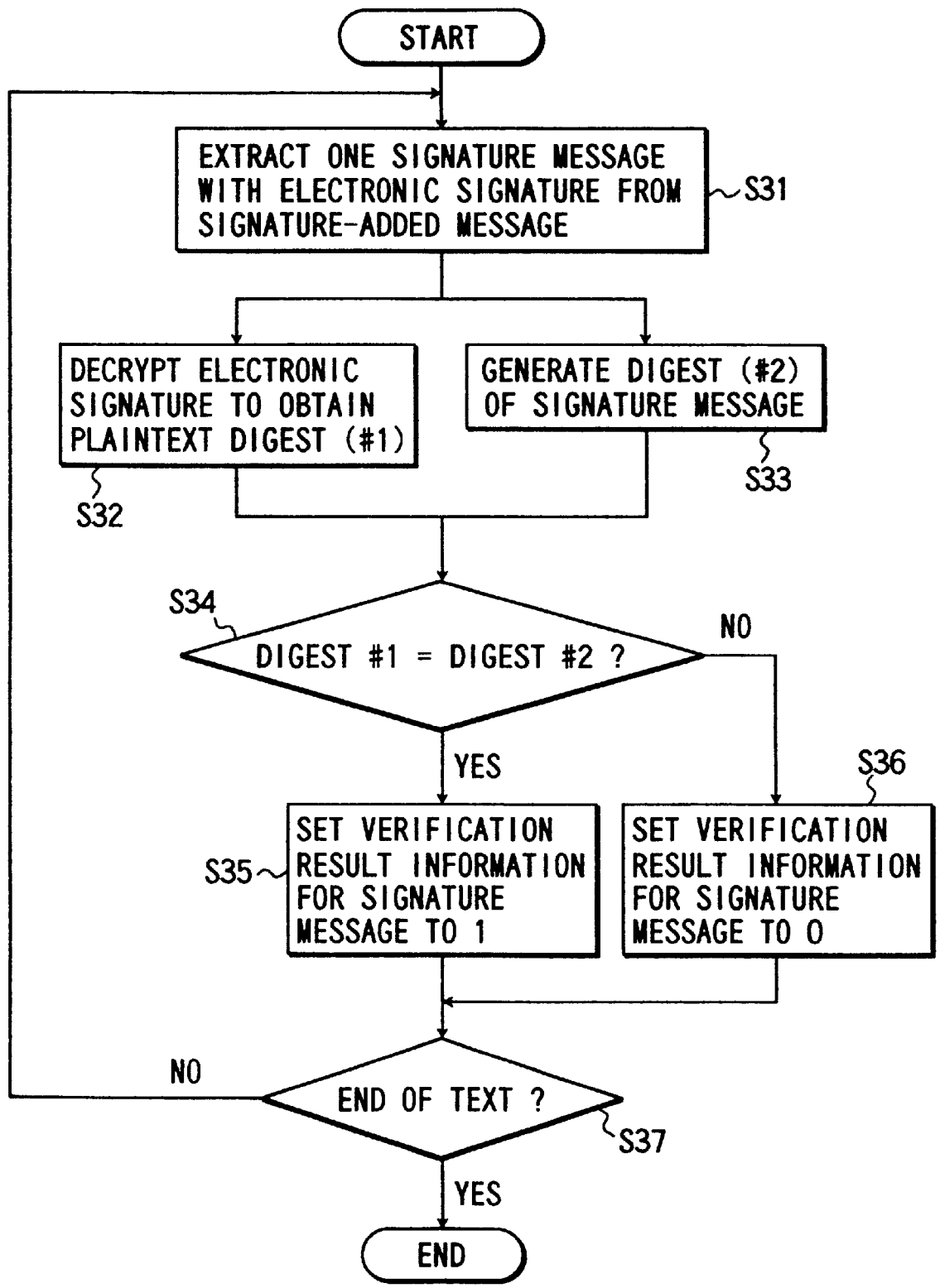
FIG. 6 is a flow chart showing a signature verification processing sequence according to the first embodiment.

This system is installed in the reception terminal. FIG. 5 is a block diagram showing the arrangement of this system. FIG. 6 is a flow chart showing a signature verification processing sequence in this electronic signature verification apparatus.

As shown in FIG. 5, this electronic signature verification system comprises a signature divider 22, a digest generator 24, a decrypter 28, a public key memory 30, and a comparator 32.

A "signature-added message" is a document added with an electronic signature for each divided message by the above-mentioned electronic signature addition system, as shown in FIG. 4.

The signature divider 22 extracts a set of signature message and electronic signature from the signature-added message (step S31), as shown in FIG. 6.

Several methods may be proposed for the above extraction. One method is to extract a signature message using the same process as used by the delimiter character detector 2 upon adding an electronic signature and at the same time extracting an electronic signature having a predetermined bit length and added to a position before or after the signature message. Another method is to detect a label consisting of "##Signature=" and "##" and easily extract each set of signature message and electronic signature when the label is added to part of the electronic signature as described above. Still another method is to detect a label consisting of "##SN=" and "##" and easily extract each set of signature message and electronic signature when divided document information sandwiched by this label is added to each signature message.

The decrypter 28 shown in FIG. 5 decrypts the electronic signature using a public key of public key decryption scheme stored in the public key memory 30, thereby obtaining a digest (this will be defined as digest #1) (step S32).

The public key here corresponds to the secret key used by the encrypter 8 in adding the electronic signature. In this embodiment, this public key is distributed to the receiver in advance and prestored in correspondence with the signer information (signer ID) and the key ID included in the electronic signature header (Table 1). The decrypter 28 can obtain the public key with reference to the electronic signature header. Note that this public key may be stored in a public key server or public key database.

The digest generator 24 shown in FIG. 5 checks the electronic signature header to specify the same hash function as used by the digest generator 4 in adding the electronic signature, and applies the specified hash function to the extracted signature message. Therefore, a digest (this will be defined as digest #2) for this signature message is generated (step S33).

The digest #1 generation process by the decrypter 28 and the digest #2 generation process by the digest generator 24 may be sequentially or simultaneously performed.

The comparator 32 compares digest #1 with digest #2 (step S34 in FIG. 6). If these digests coincide with each other, the corresponding signature message is found not to have been altered. Verification result information for this signature message is defined as valid information (e.g., 1) (step S35). If these digests, however, do not coincide with each other, alteration of this signature message is detected. Verification result information of this signature message is defined as invalid information (e.g., 0) (step S36). For example, the verification result information may be added immediately before or after the corresponding electronic signature. Alternatively, when a sequence number sandwiched by the label consisting of "##SN=" and "##" is added to each signature message, a pair of sequence number and verification result information may be recorded.

The above processing is repeatedly performed until the end of document is detected in step S37 in FIG. 6.

FIG. 7 is a flow chart showing another signature verification processing sequence of the electronic signature verification system. This sequence invalidates a whole document if at least one altered signature message is present in the document.

In this case, the comparison in steps S31 to S34 and the detection of the end of document in step S37 are identical to those in FIG. 6. In the sequence of FIG. 7, however, when no coincidence is established in the comparison in step S34, nothing is recorded. When no coincidence is established in the comparison of step S34, the processing ends immediately by abnormal termination. When the end of document is detected in step S37 and no alteration is detected in all the signature message, the processing ends by normal termination.

When each terminal is capable of both data transmission and data reception, both the electronic signature addition system function and the electronic signature verification system function can be added to a computer. In this case, the constituent components of the delimiter character detector 2 and the divider 22 can be shared.

As described above, according to this embodiment, an electronic signature is added for each signature message (divided message). Even if an electronic document such as an E-mail is partially extracted and cited, alteration or the like of the cited portion can be verified.

Control characters are preferably added to the divided document information and electronic signature (signature header and signature body) of the signature message so as not to display them on a monitor or print them.

Second Embodiment

The second embodiment of the present invention will be described below.

In addition to the functions of the first embodiment, the second embodiment has a function of, when the meaning of a document is not changed, but the structure of the document is changed, processing this document as a non-altered document. The same reference numerals as in the first embodiment denote the same parts in the second embodiment, and a detailed description thereof will be omitted.

An electronic signature addition system will be described first.

Figure 9:
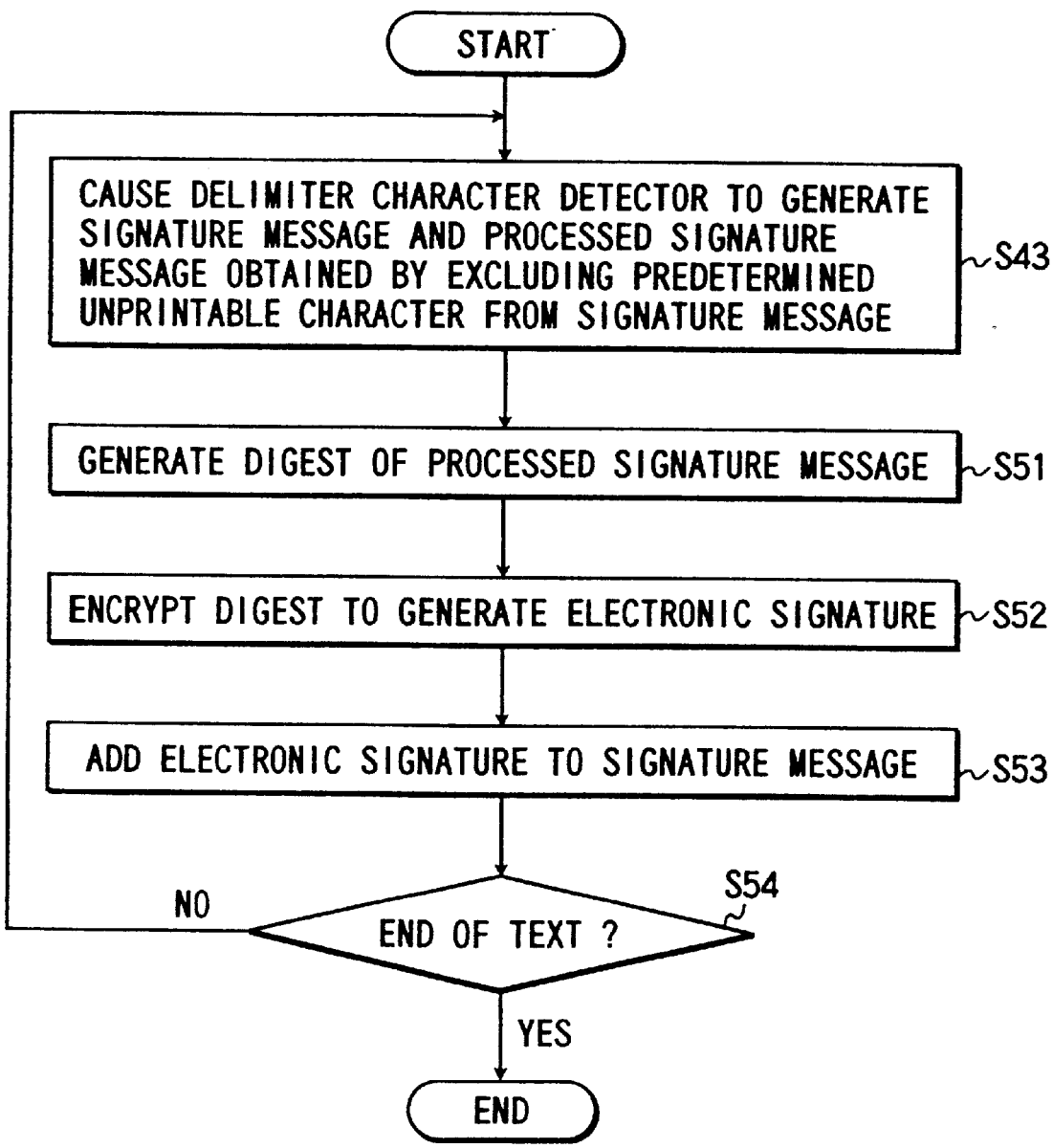
FIG. 9 is a flow chart showing a signature adding processing sequence of the second embodiment.

FIG. 8 is a block diagram showing the arrangement of this system, and FIG. 9 is a flow chart showing a signature addition processing sequence.

As shown in FIG. 8, the electronic signature addition system comprises a delimiter/unprintable character detector 40, a digest generator 4, a decrypter 8, a secret key memory 10, and a signature-added message generator 12.

A data text in FIG. 8 is a whole text to be added with a signature, i.e., a normal document constituted by a plurality of sentences or paragraphs.

The delimiter/unprintable character detector 40 has a delimiter character detector 2 and an unprintable character excluding unit 41. The delimiter character detector 2 has a function of detecting a predetermined position or a plurality of delimiter characters from the data text and breaking up the data text into signature message each having a delimiter character at the end of the message and having an appropriate length as in the first embodiment. The unprintable character excluding unit 41 has a function of excluding a predetermined unprintable character from a signature message (step S43 in FIG. 9).

The delimiter character to be detected can be defined as a predetermined position or a plurality of characters as in the first embodiment, and a detailed description thereof will be omitted. Such delimiter characters are stored in a delimiter character list 14 in advance.

An unprintable character is a character which is not printed, such as a space, tab, or line return. For example, such unprintable characters are enclosed within the range indicated by the thick line in the ASCII code table in FIG. 11. These unprintable characters are stored in an unprintable character list 42 (FIG. 8) in advance.

Figure 10:
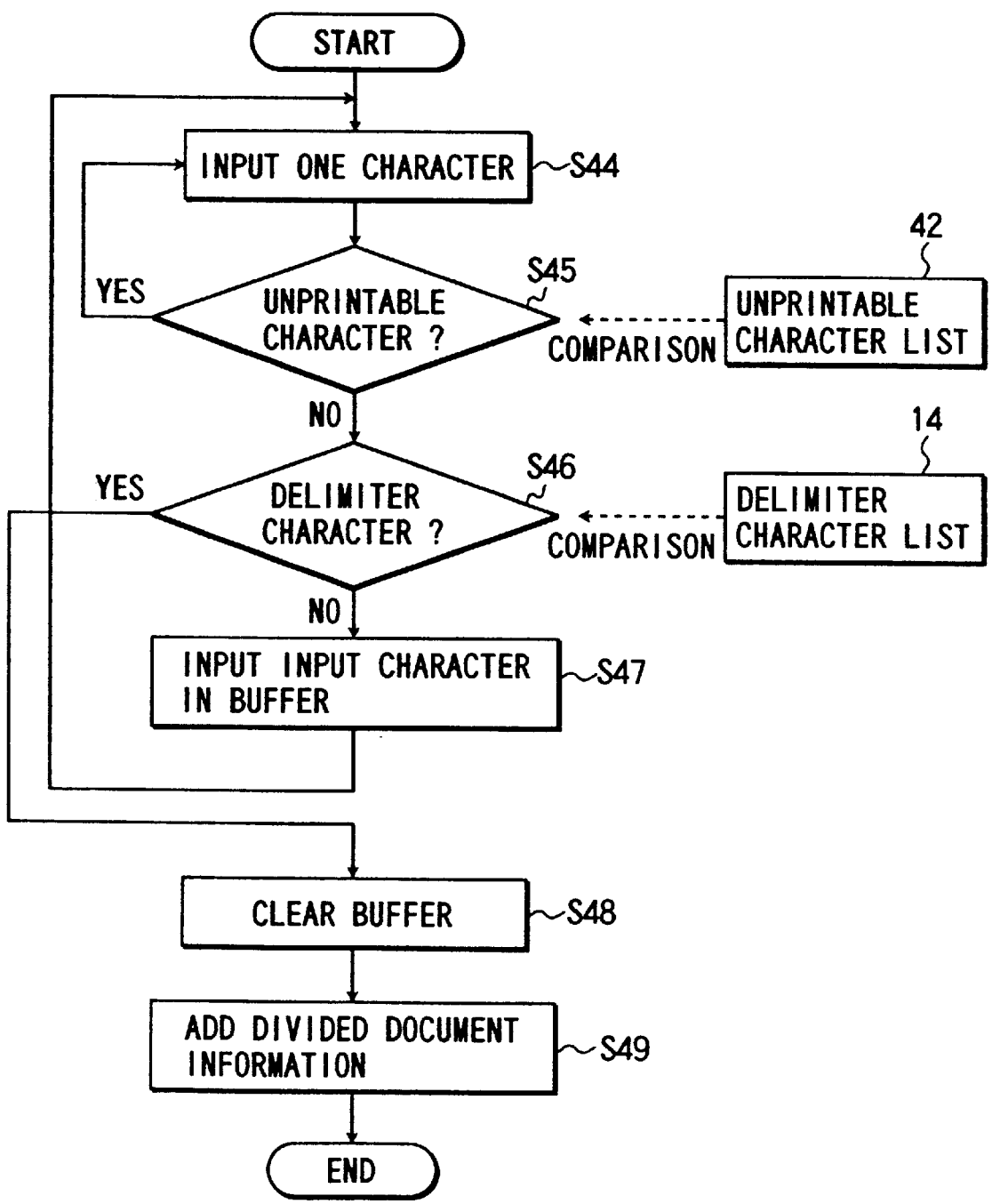
FIG. 10 is a flow chart showing a processed signature message generation processing sequence in a delimiter character detector.

Processing in the delimiter/unprintable character detector 40 is shown in FIG. 10.

The detector 40 extracts the first character from the data text (step S44). It is then determined whether the extracted character is a predetermined unprintable character registered in the unprintable character list 42 (step S45). When the extracted character is not an unprintable character, i.e., when the extracted character is a printable character, it is determined whether the extracted character is a predetermined delimiter character registered in the delimiter character list 14 (step S46). If the extracted character is not a delimiter character, the extracted character is stored in a buffer (step S47). The next character is extracted from the data text, and processing (S44 to S46) is repeated. When the extracted character is a predetermined limiter character, the stored character string is extracted as a signature message (divided message) as in the first embodiment, and the buffer is cleared (step S48).

If it is determined in step S45 that the extracted character is not an unprintable character, the extracted character is not stored in the buffer. The next character is extracted from the data text, and processing (S44 and S45) is repeated. That is, unprintable characters contained in the data text are excluded in step S45, and only printable characters are sent to step S46.

The signature message, i.e., the divided message obtained in this embodiment is data from which unprintable characters are excluded, unlike the signature message or divided message in the first embodiment.

The delimiter character determination (step S46) and the unprintable character determination (step S45) may be performed in an order reverse to that in FIG. 10, or may be separately performed. In the latter case, two buffers must be used.

The delimiter/unprintable character detector 40 detects a delimiter character, but may detect a delimiter character string. For example, a period or a line return which singly appears is not detected as a message delimiter. Instead, when a period "." and a line return consecutively appear, a message delimiter may be determined.

As shown in FIG. 10, this delimiter/unprintable character detector 40 also adds divided document information to a signature message (step S49). This divided document information is information corresponding to the sixth field in Table 1 previously described and also includes unprintable character exclusion information in addition to the information of the first embodiment.

Step 43 in FIG. 9 becomes complete by the above processing.

As in the first embodiment, a digest is generated from a signature message (data from which unprintable characters are excluded and to which divided document information is added) in step S51. In step S52, the digest is encrypted using a secret key to generate an electronic signature. In step S53, this electronic signature is added as the 11th field to the signature message together with the electronic signature header (first to 10th fields) described using Table 1.

This operation makes it possible to generate a pair of signature message (divided message) and electronic signature. This processing is repeated until the end of data text is determined (step S54). As a result, signature-added message as in FIG. 4 can be obtained.

An electronic signature verification system of this embodiment will be described below.

Figure 12:
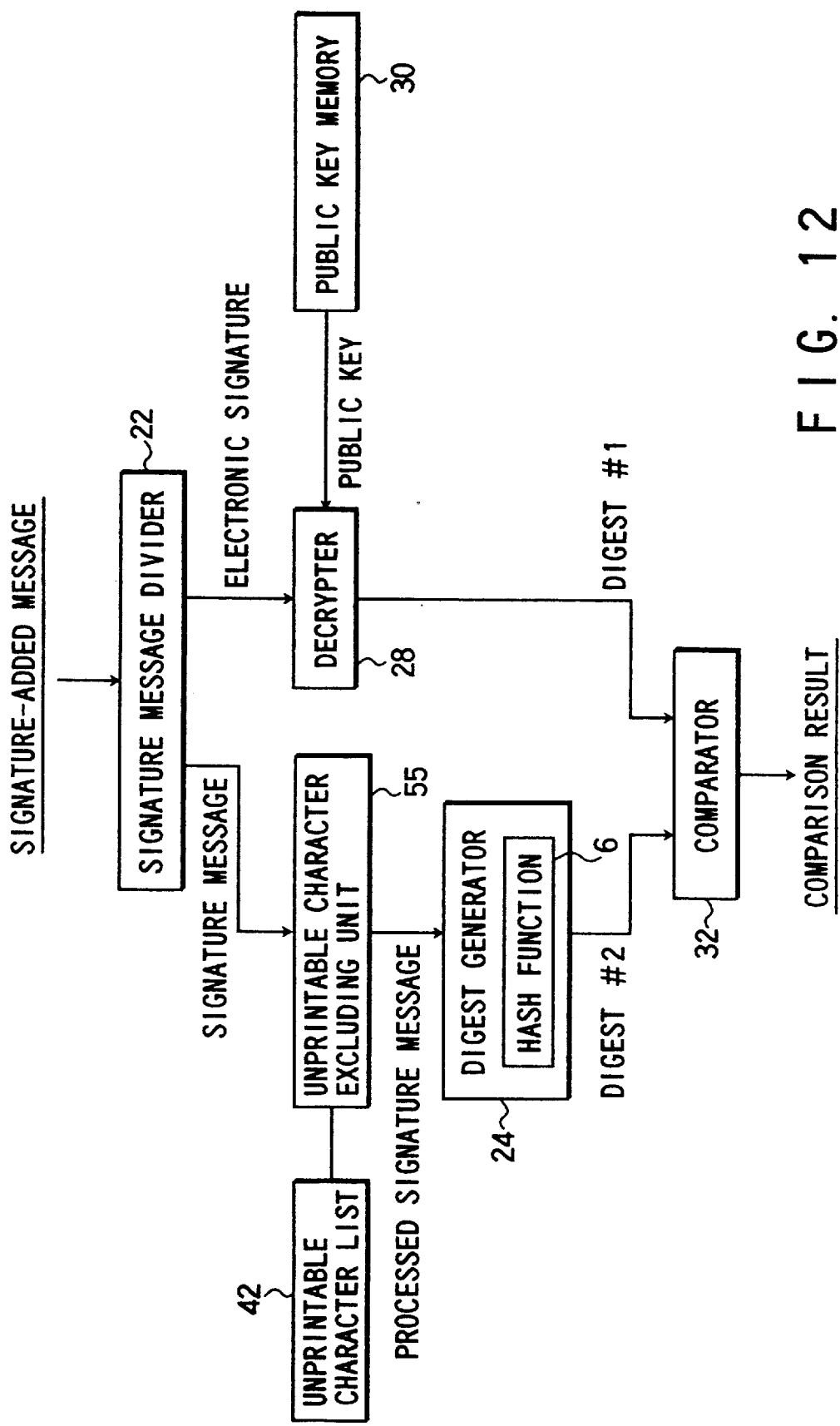
FIG. 12 is a block diagram showing the arrangement of an electronic signature verification apparatus according to the second embodiment.
Figure 13:
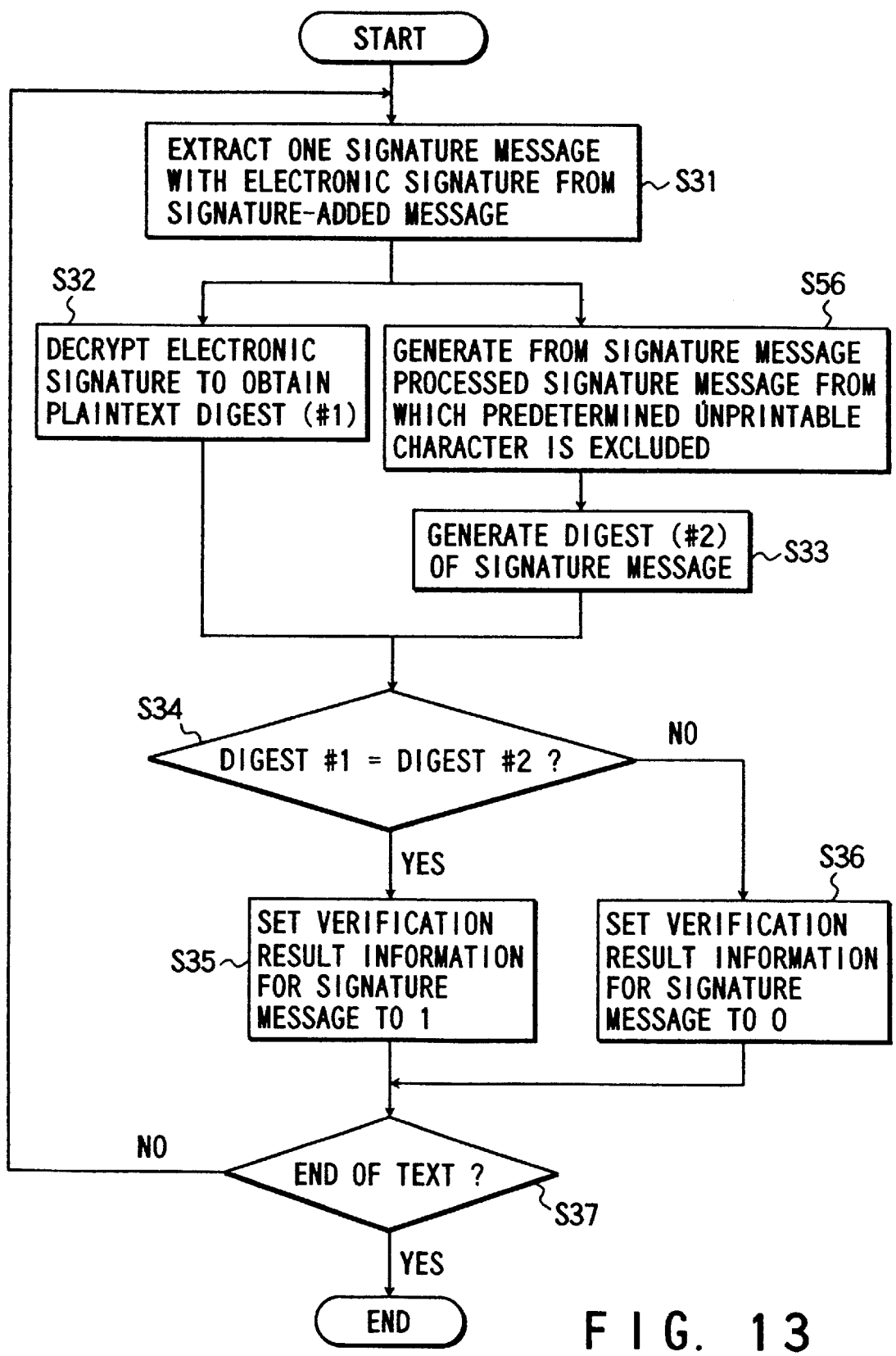
FIG. 13 is a flow chart showing a signature verification processing sequence according to the second embodiment.

FIG. 12 shows the arrangement of this system, and FIG. 13 is a flow chart showing the processing of the system.

The electronic signature verification system of this embodiment is substantially the same as that of first embodiment in that the system of the second embodiment comprises an unprintable character excluding unit 55, as shown in FIG.

12. The same reference numerals as in the first embodiment denote the same parts, and a detailed encryption thereof will be omitted. The same processing steps as in the first embodiment in the processing steps of FIG. 13 denote the same operations, and a detailed description thereof will be omitted.

The unprintable character excluding unit 55 excludes predetermined unprintable characters from a signature message using the same unprintable list 42 as used in the electronic signature addition system of the first embodiment (step S56 in FIG. 13). In this case, it is preferable to detect that unprintable characters have been excluded from the signature message with reference to unprintable character exclusion information contained in the divided document information (corresponding to the sixth field of Table 1).

The digest generator 24 generates a digest (this will be defined as digest #2) for the generated processed signature message in accordance with the same hash function 6 as in the electronic signature addition system (FIG. 6) (step S33).

The digest #1 generation processing by the decrypter 28 and the digest #2 generation processing by the unprintable character excluding unit 23 and the digest generator 24 may be performed in this order or reversed order, or simultaneously.

A comparator 32 compares digest #1 with digest #2 (step S34 in FIG. 13). If digest #1 coincides with digest #2, the signature message is found not to have been altered. The verification result information of this signature message is set as valid information (e.g., 1) (step S35). If these digests, however, do not coincide with each other, alteration of this signature message is detected. Verification result information of this signature message is defined as invalid information (e.g., 0) (step S36). For example, the verification result information may be added immediately before or after the corresponding electronic signature. Alternatively, when a sequence number sandwiched by the label consisting of "##SN=" and "##" is added to each signature message, a pair of sequence number and verification result information may be recorded.

The above processing is repeatedly performed until the end of document is detected in step S37 in FIG. 6.

FIG. 14 is a flow chart showing another signature verification processing sequence of the electronic signature verification system. This sequence invalidates a whole document if at least one altered signature message is present in the document, as in the case described with reference to FIG. 7 in the first embodiment. This sequence has been described in the first embodiment, and a detailed description there of will be omitted.

In the second embodiment as well, one terminal can have the electronic signature addition system function and the electronic signature verification system function. In this case, the constituent components of the delimiter character detector, the unprintable character excluding unit, the digest generator, and the hash function can be shared.

According to the second embodiment, the same effect as in the first embodiment can be obtained. In addition, the following effects are also obtained.

More specifically, in the second embodiment, even if a person who has received an E-mail inserts, in good faith, a control character (e.g., a space or line return) not associated with the meaning of the document and transmits the resultant document to a third party, the unprintable characters can be excluded to determine a valid document. The document can be handled as a non-altered document.

According to this embodiment, even if a person who has received an E-mail deliberately alters the document (changes the meaning of the document) and adds several unprintable characters in the altered document to allow generation of the same message digest, these unprintable characters are excluded to determine an invalid document. Therefore, alteration of the document can be detected.

In the second embodiment, the document is divided into predetermined paragraphs as in the first embodiment. However, such division need not be performed, and unprintable characters may be excluded from the entire data text. In the second embodiment, for example, this system can be easily arranged by omitting a constituent portion for detecting a delimiter character to generate a signature message, i.e., a constituent portion for dividing the data text in units of signature message. That is, on the electronic signature addition system side, a predetermined unprintable character is deleted from the data text to generate a digest, the digest is encrypted, and the resultant electronic signature is added to the data text. On the other hand, on the electronic signature verification system side, the predetermined unprintable character is deleted from the received data text to generate digest #1, the electronic signature added to the data text is decrypted to generate digest #2, and digest #1 is compared with digest #2.

Third Embodiment

The third embodiment of the present invention will be described with reference to FIGS. 15 to 18.

As described with reference to the prior art, a person who intends to alter a document implements document alteration such that the message digest of the altered document coincides with that of the document before alteration. For this purpose, an unprintable character is often used.

In this embodiment, the total number of printable characters and the total number of unprintable characters are substituted into a predetermined calculation expression to obtain a reliability evaluation value, as will be described below.

Let m be the number of characters of a document.

It is possible to insert one unprintable character in this document to obtain the same message digest without changing the contents of the document. The number of corrupt digests is expressed by the product of the types p of unprintable characters to be inserted and positions (m+1) where the unprintable characters are inserted:

$$L = p \times (m+1)$$

$L_1$=(number of digests generated by addition of one unprintable character)
p=(number of types of unprintable characters)
m=(number of document characters)

When two unprintable characters are to be added, the number of combinations of two elements is $p^2$, and their positions can be approximated by the product of insertable positions (m+1) of the first element and insertable positions (m+2) of the second element. For this reason, when k unprintable characters are added, the number L of corrupt digests is given by:

$$L_k = (p^k) \times (m+1) \times (m+2) \times \ldots \times (m+k)$$

$L_k$=(number of digests generated by adding k unprintable characters)
p=(number of types of unprintable characters)
m=(number of document characters)

k=(number of unprintable characters)

If the bit length of a message digest is defined as L, the number of message digests generated by a valid means is 2^L. The ratio of the number $L_k$ of corrupt message digests to the number 2^L serves as a reliability index for the message digest.

$$T=(p^k)\times(m+1)\times(m+2)\times \ldots \times(m+k)/(2^L)$$

p=(number of types of unprintable characters)
m=(number of document characters)
k=(number of unprintable characters)
L=(bit length of message digest)

FIG. 15 shows the calculation result of the maximum number of unprintable characters alterable with T=0.0001, i.e., a probability of 1/10,000 by using the number of document characters (number of valid characters) and the bit length of the digest. In this case, the number of types of unprintable characters is 34.

According to the above result, when a 128-bit message digest is generated for a document having 1,000 (nearly equal 2^10) characters, the reliability of the digest is sufficiently high (alteration probability is 1/10,000 or less), provided that the number of unprintable characters is 7 or less. A higher reliability degree is required depending on the types of documents. However, a desired reliability degree can be assured by performing similar calculations. A C language program used in this calculation is shown in FIG. 16.

Figures 16, 17:
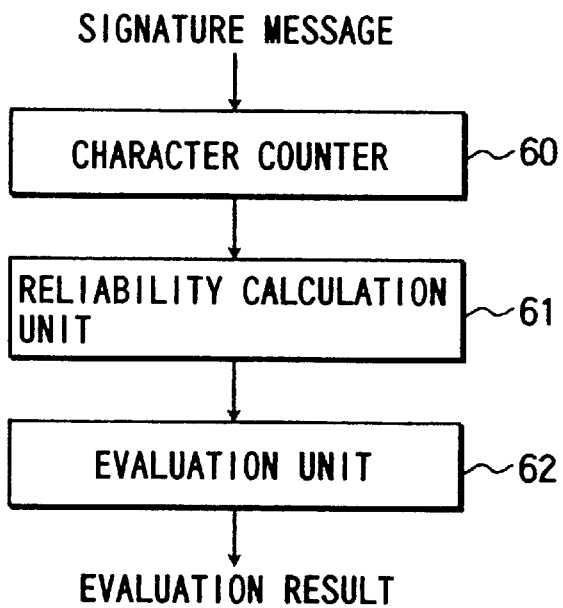
FIG. 16 is a view showing a signature reliability degree calculation program.
FIG. 17 is a block diagram showing the arrangement of a reliability evaluation apparatus according to the third embodiment of the present invention.
Figure 18:
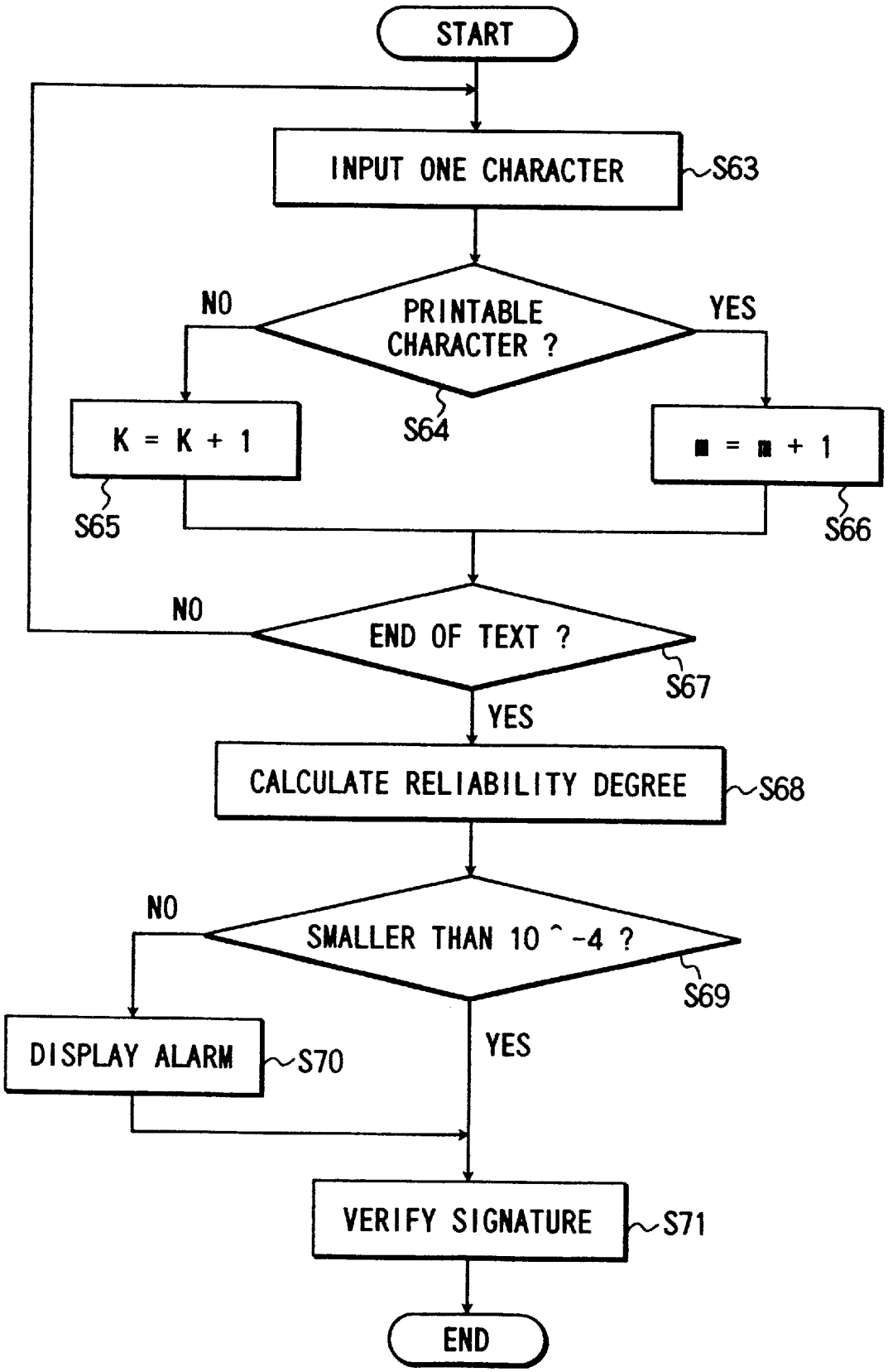
FIG. 18 is a flow chart showing a reliability evaluation processing sequence of the third embodiment.

FIG. 17 is a block diagram showing the arrangement of a reliability evaluation system of this embodiment. FIG. 18 is a flow chart showing a reliability evaluation processing sequence of this reliability evaluation system.

The reliability evaluation system is installed in the reception terminal device. As shown in FIG. 17, the reliability evaluation system comprises a character counter 60, a reliability calculation unit 61, and an evaluation unit 62.

The character counter 60 extracts characters one by one from one signature message (step S63) to determine whether the extracted character is printable (step S64). If YES in step S64, one is added to m (step S65); otherwise, one is added to k (step S66). Steps S63, S64, and S65 or steps S63, S64, and S66 are executed until one signature message is complete in step S67, thereby counting the number m of printable characters and the number k of unprintable characters.

The reliability calculation unit 61 calculates the reliability in accordance with, e.g., the program shown in FIG. 16 (step S68).

The evaluation unit 62 determines whether the resultant reliability value is equal to or smaller than a predetermined threshold value (0.0001 in this case) (step S69). If the reliability value exceeds the threshold value, a message representing that the document may have been altered is displayed on a display device (not shown) or the like, thereby generating an alarm (step S70).

After this reliability evaluation processing, predetermined electronic signature verification processing (e.g., conventional electronic signature verification in FIG. 21 or electronic signature verification of the first embodiment) is performed (step S71).

As described above, according to this embodiment, the reliability of the electronic signature is calculated on the basis of the total number of printable characters and the total number of unprintable characters, thereby evaluating the alteration possibility. An alarm or the like can be generated, as needed.

Each apparatus of each embodiment can be arranged by hardware, and portions for performing processing operations can be arranged by software. In addition, for example, a program for executing the corresponding processing sequence may be stored as a program for controlling a computer in a computer-readable storage medium, the computer may be made to read out the program from the storage medium, and the readout program may run on the computer.

The present invention is not limited to the particular embodiments described above. Various changes and modifications may be made within the technical scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A method of adding an electronic signature to document data, comprising the steps of:

dividing the document data into a plurality of divided document data using as a delimiter a predetermined character appearing in a document represented by the document data;

generating an electronic signature for each of the divided document data on the basis of the divided document data; and storing the divided document data, the electronic signature based on the divided document data, and information for associating the divided document data with the electronic signature.

2. A method according to claim 1, wherein the information for associating the divided document data with the electronic signature contains:

information about division of document data contained in the divided document data; and non-encrypted information about division of document data contained in the electronic signature.

3. A method according to claim 1, further comprising the step of excluding from the document data an unprintable character appearing in the document data and storing the excluded unprintable character.

4. A method of verifying the electronic signature generated by the method of claim 1, comprising the step of, when the divided document data added with the electronic signature is contained in the received document data, determining the validity of the document for each divided document data on the basis of information for associating the divided document data with the electronic signature.

5. A method of adding an electronic signature to document data, comprising the steps of:

storing the document data upon excluding a predetermined character appearing in a document represented by the document data;

generating an electronic signature on the basis of the document data from which the predetermined character is excluded; and storing the document data from which the predetermined character is not excluded, the electronic signature, and information for associating the electronic signature with the document data from which the predetermined character is not excluded.

6. A method according to claim 5, wherein the predetermined character is an unprintable character.

7. A method according to claim 5, wherein the information for associating the electronic signature with the document data contains information associated with exclusion of the predetermined character.

8. A method of verifying the electronic signature generated by the method of claim 5, comprising the step of excluding the predetermined character from the document data on the basis of information for associating the electronic signature with the document data and determining the validity of the document data on the basis of the electronic signature and data from which the predetermined character is excluded.

9. A method of evaluating reliability associated with alteration of document data with an electronic signature, comprising the steps of:
   obtaining a total number of printable characters in the document data and a total number of unprintable characters in the document data; and
   evaluating reliability on the basis of the total numbers of printable and unprintable characters.

10. A method according to claim 9, wherein the step of evaluating reliability comprises
   calculating a reliability value T by:

$$T=(p^k)\times(m+1)\times(m+2)\times \ldots \times(m+k)/(2^L)$$

where p is the number of types of unprintable characters, m is the number of document characters, k is the number of printable characters, and L is the bit length of a message digest, and
   evaluating reliability of the signature information by comparing the obtained reliability value T and a predetermined threshold value.

11. An apparatus for adding an electronic signature to document data, comprising:
   input means for the document data;
   means for dividing the input document data into a plurality of divided document data using as a delimiter a predetermined character appearing in a document represented by the document data;
   means for generating an electronic signature based on the divided document data for each divided document data; and
   means for outputting the divided document data, the electronic signature based on the divided document data, and information for associating the divided document data with the electronic signature.

12. An apparatus according to claim 11, further comprising means for making the information for associating the divided document data with the electronic signature contain information about division of document data contained in the divided document data, and non-encrypted information about division of document data contained in the electronic signature.

13. An apparatus according to claim 11, further comprising means for excluding from the document data an unprintable character appearing in the document data and storing the excluded unprintable character.

14. An apparatus for verifying the electronic signature generated by the apparatus of claim 1, comprising means for, when the divided document data added with the electronic signature is contained in the received document data, determining the validity of the document for each divided document data on the basis of information for associating the divided document data with the electronic signature.

15. An apparatus for adding an electronic signature to document data, comprising:
   input means for the document data;
   means for storing the document data upon excluding a predetermined character appearing in a document represented by the document data;
   means for generating an electronic signature on the basis of the document data from which the predetermined character is excluded; and
   means for storing the document data from which the predetermined character is not excluded, the electronic signature, and information for associating the electronic signature with the document data from which the predetermined character is not excluded.

16. An apparatus according to claim 15, wherein the predetermined character is an unprintable character.

17. An apparatus according to claim 15, further comprising means for making the information for associating the electronic signature with the document data contain information about exclusion of the predetermined character.

18. An apparatus for verifying the electronic signature generated by the apparatus of claim 15, comprising means for excluding the predetermined character from the document data on the basis of the information for associating the electronic signature with the document data and determining the validity of the document data on the basis of the electronic signature and data from which the predetermined character is excluded.

19. An apparatus for evaluating reliability associated with alteration of document data with an electronic signature, comprising:
   means for obtaining a total number of printable characters in the document data and a total number of unprintable characters in the document data; and
   means for evaluating reliability on the basis of the total numbers of printable and unprintable characters.

20. An apparatus according to claim 19, wherein said means for evaluating reliability
   calculates a reliability value T by:

$$T=(p^k)\times(m+1)\times(m+2)\times \ldots \times(m+k)/(2^L)$$

where p is the number of types of unprintable characters, m is the number of document characters, k is the number of printable characters, and L is the bit length of a message digest, and
   evaluates reliability of the signature information by comparing the obtained reliability value T and a predetermined threshold value.

21. A computer program product for causing a computer system to execute processing for adding an electronic signature to document data, comprising:
   a recording medium;
   means for supplying to said computer system an instruction recorded on said recording medium to divide the document data into a plurality of divided document data by using as a delimiter a predetermined character appearing in a document represented by the document data;
   means for supplying to said computer system an instruction recorded on said recording medium to generate an electronic signature based on the divided document data for each divided document data; and
   means for supplying to said computer system an instruction recorded on said recording medium to store the divided document data, the electronic signature based on the divided document data, and information for associating the divided document data with the electronic signature.

22. A product according to claim 21, wherein the information for associating the divided document data with the electronic signature contains:

information about division of document data contained in the divided document data; and non-encrypted information about division of document data contained in the electronic signature.

23. A product according to claim 21, further comprising means for supplying to said computer system an instruction recorded on said recording medium to exclude an unprintable character appearing in the document data and storing the unprintable character.

24. A computer program product for causing a computer system to verify the electronic signature generated in claim 21, comprising:

a recording medium; and means for, when the divided document data added with the electronic signature is contained in the received document data, supplying to said computer system an instruction recorded on said recording medium to determine the validity of the document for each divided document data on the basis of information for associating the divided document data with the electronic signature.

25. A computer program product for causing a computer system to execute processing for adding an electronic signature to document data, comprising:

a recording medium;

means for supplying to said computer system an instruction recorded on said recording medium to exclude a predetermined character appearing in a document represented by the document data and store the excluded predetermined character;

means for supplying to said computer system an instruction recorded on said recording medium to generate an electronic signature on the basis of the document data from which the predetermined character is excluded; and means for supplying to said computer system an instruction recorded on said recording medium to store the document data from which the predetermined character is not excluded, the electronic signature, and information for associating the electronic signature with the document data from which the predetermined character is not excluded.

26. A product according to claim 25, wherein the predetermined character is an unprintable character.

27. A product according to claim 25, wherein the information for associating the electronic signature with the document data contains information about exclusion of the predetermined character.

28. A computer program product for causing a computer system to verify the electronic signature generated by the product of claim 25, comprising:

a recording medium; and means for supplying to said computer system an instruction recorded on said recording medium to exclude a predetermined character from the document data on the basis of the information for associating the electronic signature with the document data and determine the validity of the document on the basis of the electronic signature and data from which the predetermined character is excluded.

29. A computer program product for causing a computer system to evaluate reliability associated with alteration of document data added with an electronic signature, comprising:

a recording medium;

means for supplying to said computer system an instruction recorded on said recording medium to obtain a total number of printable characters in the document data and a total number of unprintable characters in the document data; and means for supplying to said computer system an instruction recorded on said recording medium to evaluate reliability on the basis of the total numbers of printable and unprintable characters.

30. A product according to claim 29, wherein said means for evaluating reliability causes said computer system to perform processing for calculating a reliability value T by:

$$T=(p^k)\times(m+1)\times(m+2)\times \ldots \times(m+k)/(2^L1)$$

where p is the number of types of unprintable characters, m is the number of document characters, k is the number of printable characters, and L is the bit length of a message digest, and evaluating reliability of the signature information by comparing the obtained reliability value T and a predetermined threshold value.

* * * * *